(12) United States Patent
Vermeulen et al.

(10) Patent No.: US 10,367,676 B1
(45) Date of Patent: Jul. 30, 2019

(54) STABLE LEADER SELECTION FOR DISTRIBUTED SERVICES

(71) Applicant: Amazon Technologies, Inc., Seattle, WA (US)

(72) Inventors: Allan Henry Vermeulen, Corvallis, OR (US); Leonard Thomas Tracy, Bothell, WA (US); Tate Andrew Certain, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 362 days.

(21) Appl. No.: 14/868,274

(22) Filed: Sep. 28, 2015

(51) Int. Cl.
*H04L 12/24* (2006.01)

(52) U.S. Cl.
CPC ......... *H04L 41/0213* (2013.01); *H04L 41/50* (2013.01)

(58) Field of Classification Search
CPC ............................ H04L 41/0213; H04L 41/50
See application file for complete search history.

(56) References Cited

U.S. PATENT DOCUMENTS

| 7,346,682 | B2 | 3/2008 | Basani et al. | |
| 7,421,578 | B1* | 9/2008 | Huang | ................. H04L 63/065 370/254 |
| 8,583,958 | B2 | 11/2013 | Basani et al. | |
| 9,047,246 | B1* | 6/2015 | Rahut | ................. G06F 11/1425 |
| 2002/0165977 | A1* | 11/2002 | Novaes | ............... H04L 12/1877 709/238 |
| 2004/0071087 | A1* | 4/2004 | Siev | .................. H04L 29/12009 370/235 |
| 2005/0132154 | A1* | 6/2005 | Rao | .................... H04L 67/1097 711/162 |
| 2005/0198359 | A1* | 9/2005 | Basani | ................ H04L 67/1095 709/232 |
| 2008/0062945 | A1* | 3/2008 | Ahuja | .................. H04W 8/005 370/342 |
| 2008/0071878 | A1* | 3/2008 | Reuter | ................ H04L 67/1031 709/208 |
| 2014/0059154 | A1* | 2/2014 | Hotham | .................. H04L 41/04 709/209 |

(Continued)

FOREIGN PATENT DOCUMENTS

CN            1863130          11/2006

OTHER PUBLICATIONS

U.S. Appl. No. 14/670,238, filed Mar. 26, 2015, Carlos Vara Callau et al.
U.S. Appl. No. 14/489,451, filed Sep. 17, 2014, Chi Hai Ho.

*Primary Examiner* — Uzma Alam
(74) *Attorney, Agent, or Firm* — Robert C. Kowert; Meyertons, Hood, Kivlin, Kowert & Goetzel, P.C.

(57) ABSTRACT

A first role manager of a distributed service determines that a leadership assignment decision is to be made with respect to a particular node of the service. The first role manager identifies a particular role indicator value from a first subset of a set of role indicator values according to a value selection order of a role assignment policy of the service. The first role manager is not permitted to assign values from a different subset of the first set of role indicator values. The particular role indicator value is transmitted to the particular node, enabling the particular node to fulfill at least a first category of service requirements corresponding to the role of leader node.

20 Claims, 11 Drawing Sheets

(56) References Cited

U.S. PATENT DOCUMENTS

| | | | |
|---|---|---|---|
| 2014/0059532 A1* | 2/2014 | Hotham | G06F 8/65 717/171 |
| 2016/0034566 A1* | 2/2016 | Rahut | G06F 11/1425 707/769 |
| 2016/0112483 A1* | 4/2016 | Tash | H04L 67/1044 709/224 |
| 2016/0183093 A1* | 6/2016 | Vaughn | H04W 12/08 455/528 |
| 2017/0070597 A1* | 3/2017 | Bute | H04L 67/10 |

\* cited by examiner

STABLE LEADER SELECTION FOR DISTRIBUTED SERVICES

BACKGROUND

Implementing computing systems that manage large quantities of data and/or service large numbers of users often presents problems of scale. As demand for various types of computing services grows, it may become difficult to service that demand without increasing the available computing resources accordingly. To facilitate scaling in order to meet demand, many computing-related services are implemented as distributed applications executed on a number of computer hardware servers. For example, a number of different software processes or nodes executing on different computer systems may operate cooperatively to implement the computing service. When more service capacity is needed, additional hardware or software resources may be deployed.

For some types of distributed services implemented at multiple nodes, one or more of the nodes may serve as a leader or coordinator of the service. For example, a leader node may be responsible for receiving service requests from clients, and orchestrating the execution of the work required to fulfill the service request by farming out respective tasks to the other (non-leader) nodes of the service. The role of the leader may be dynamically assignable in some services, e.g., so that, in the event of a failure of the current leader, a new leader can be selected and the service can continue to process client requests. In some cases, a role manager separate from the distributed service may be responsible for selecting the leader node, e.g., in response to leadership assignment requests from the service nodes. In order to support high availability for the distributed service, the role manager itself may be designed to be fault-tolerant. For example, the role manager itself may comprise a cluster of network-connected role manager nodes which use a quorum-based protocol or algorithm for selecting the leader.

In distributed systems such as multi-node services or multi-node role managers, different segments of the system might become communicatively isolated from one another, e.g., due to a failure of network communications between nodes, or due to failures of some of the nodes themselves. If the current leader node of the service fails or becomes disconnected, but the role manager remains accessible, a new leader node may be selected fairly quickly with minimal impact on the service. However, in some large-scale failure scenarios, the role manager may also fail or become disconnected (e.g., in addition to the leader node of the service), which may potentially lead to a more serious impact on the service. Furthermore, the various nodes of the service and/or the role manager may come back online in unpredictable sequences after such failures. Orchestrating a clean recovery from large scale failures remains a challenging problem for at least some types of distributed services.

Figure 1:
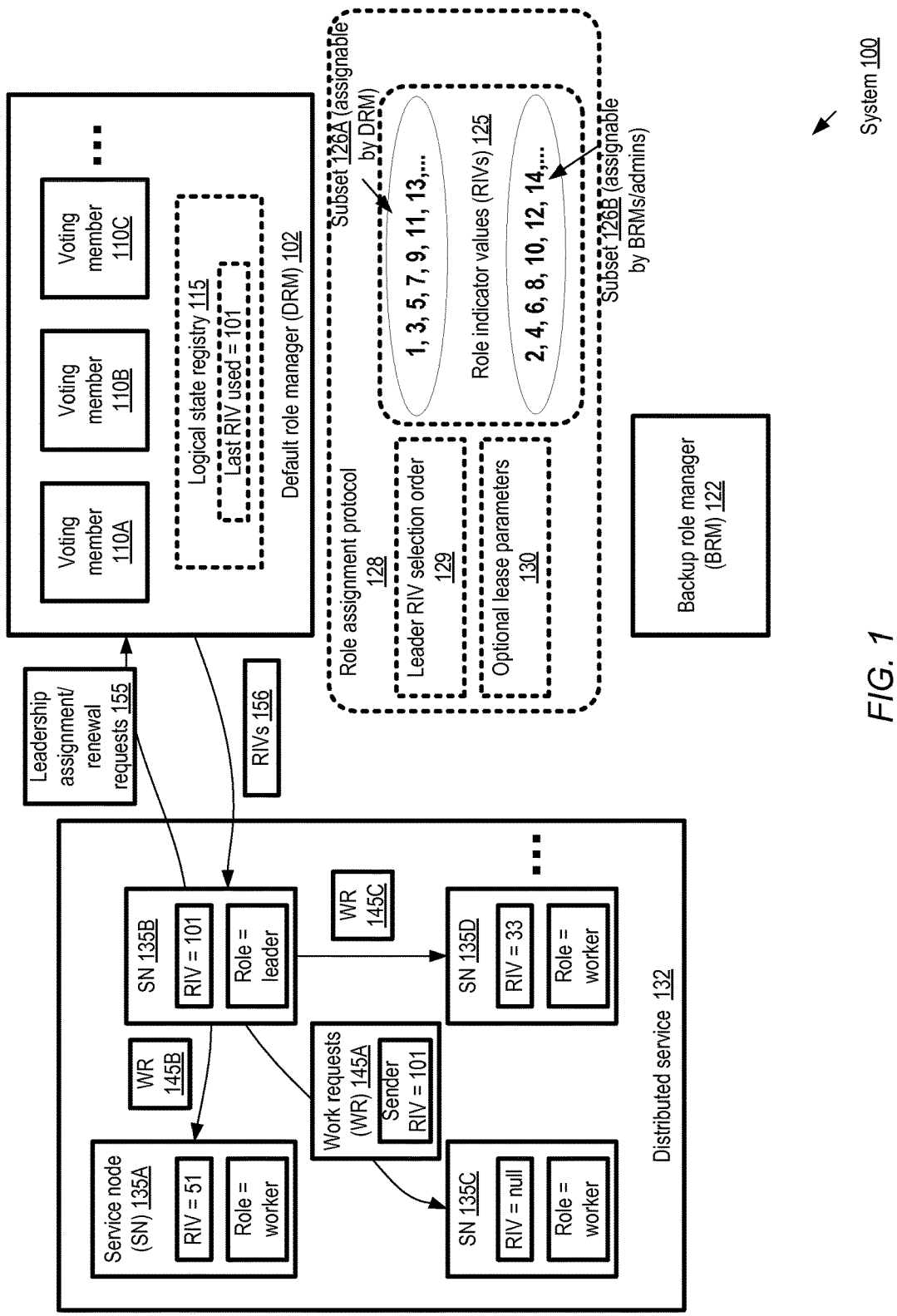
FIG. 1 illustrates an example system environment in which a subset of role indicator values may be reserved for leadership assignment by a default role manager of a distributed service, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for an enhanced leader selection process for distributed services under certain types of failure scenarios are described. A variety of business needs may be handled using distributed services in which particular service nodes are assigned leader roles with respect to at least some types of client requests. The terms "leader", "coordinator" or "controller", as used herein, may refer to a role assigned to a distributed service node, indicating that the node is responsible for orchestrating responses to one or more categories of service requirements. Generally speaking, a distributed service may comprise multiple concurrent and often autonomous nodes, communicating with one another and/or with shared resources across one or more networks. Various service processes may be executing on different physical and/or logical (e.g., virtual) resources or platforms at any given time, and the number of resources involved in the service may change over time. In some types of services, decisions as to how (e.g., by which specific components of the service) a particular service request is to be fulfilled may be made in a centralized fashion at a particular service node which is currently designated as the leader node. After the request fulfillment planning decision is made, the leader may issue commands or requests to other (non-leader) nodes to implement the lower-level operations required. In some embodiments, the work requests issued to the non-leader nodes may be expressed in the form of "state transfer" messages, such that a given non-leader node may be able to perform the requested operations based on service state information contained in the work request, without having to maintain or refer to state associated with earlier-received work requests.

Of course, as in any distributed network-connected system, the nodes and the network paths between the nodes of a distributed service may be susceptible to various types of failures (or apparent failures, in which it may appear that some portion of the service resources are not available even though they remain operational). In some embodiments, leadership may be granted (and/or revoked) dynamically— e.g., several (or all) of the service nodes may be capable of implementing the responsibilities of being the leader. If the current leader fails or becomes inaccessible, a replacement leader may be appointed according to a role assignment policy of the service. In various embodiments, the decision regarding which node is designated as the leader may be made with the help of a role manager which is implemented separately from the nodes of the distributed service itself, e.g., at one or more computing devices linked to the service nodes via a network. In one embodiment, if it appears to a given leadership-capable service node SN-k that the last-known leader (e.g., SN-j) is not accessible or non-responsive, that leadership-capable node SN-k may submit a leadership assignment request to the role manager, requesting that SN-k be designated the new leader. Of course, if the node which was most recently designated as the leader (SN-j) is unreachable or unresponsive with respect to multiple non-leader nodes, several non-leader nodes may send such leadership assignment requests in close temporal proximity to the role manager. The role manager may decide which particular node should be designated as the next leader based at least in part on the role assignment policy of the service. Once it has made the leadership decision, the decision may be propagated to some or all the reachable nodes of the distributed service. In various embodiments, a work request transmitted by a leader node to a non-leader node may include a leadership indicator, intended to enable the recipient non-leader node to recognize that the work request was sent by the leader and should therefore be fulfilled.

In some embodiments, a role assignment policy or protocol involving the use of a selected set of role indicator values may be implemented by the role manager for responding to leadership assignment requests. The role manager may determine (e.g., as part of the role manager initialization procedure, or based on configurable parameters) various parameters of the role assignment policy. Such parameters may include, for example, a set of dynamically-assignable role indicator values, a rule which indicates how the leader node is to be identified based on the currently-assigned role indicator values of the various nodes of the distributed service, an order in which the role indicator values are to be selected when responding to a series of leadership assignment requests, and so on. In one implementation, for example, the role indicator values may comprise positive integers $\{1, 2, 3, \ldots\}$. At a given point in time, one or more of the leadership-capable nodes of the distributed service may have been granted respective distinct role indicator values by the role manager (e.g., in response to respective leadership assignment requests) according to the role assignment policy. A rule of the policy may indicate the criterion to be applied to the currently-assigned set of role indicator values to identify the leader. For example, if positive integers are assigned as role indicator values, in one embodiment the node with the highest role indicator value among those currently assigned may be designated as the leader. Consider a simple example scenario in which the distributed service comprises three nodes SN1, SN2 and SN3. Assume that, at a given point in time T1, SN1 was last assigned a role indicator value of 750 by the role manager, SN2 was last assigned 698, and SN3 was last assigned 760. Then, according to the rule which indicates that the highest role indicator value corresponds to the leader, the current leader at time T1 would be SN3. In some embodiments, the role assignment policy may include the use of leases (whereby a given node to which the leader role has been assigned is also granted a leadership lease with an associated expiration time, and must renew its lease to remain leader), as described below in further detail. Role indicator values may sometimes be referred to as epoch values. A given role manager may be responsible for leadership decisions of several distributed services in some embodiments, e.g., according to respective (and potentially different) role assignment policies of the services.

In various embodiments, a role manager itself may be designed to be fault-tolerant. For example, a cluster comprising multiple network-connected role manager nodes may be employed in some embodiments, which collectively implement a quorum-based protocol to arrive at state change decisions such as responses to leadership assignment requests. Regardless of the manner in which a role manager is implemented, however, it may nevertheless suffer from failures of its own (e.g., when a large scale infrastructure-related outage occurs at a data center at which at least some of the role manager components are implemented).

If only a single role manager were to be used, the failure or inaccessibility of the role manager itself may potentially lead to downtime of a distributed service whose leadership decisions are managed at the role manager. Accordingly, in at least some embodiments, one role manager may be designated as the default or primary role manager, and a backup role management technique may be implemented in the event that the default role manager becomes unavailable. In some embodiments, a backup role manager may be implemented at one or more computing devices. Such a backup role manager may, for example, obtain notifications (e.g., from a health management service of a data center or provider network) regarding the apparent failure of the default role manager and/or one or more nodes of the distributed service. If the backup role manager detects failures at both (a) the default role manager and (b) the last-known leader node of the distributed service, and the backup role manager is still able to communicate with at least one leadership-capable node SN-x of the service, the backup role manager may assign leadership to such a node SN-x. As a result of the selection of SN-x as the leader, the nodes of the distributed service which remained online may continue to process service requests despite the near-simultaneous failure of the previous leader node and the role manager. In at least one embodiment, an administrator of the distributed service (or of a data center or provider network at which the distributed service is implemented) may perform at least some of the responsibilities of the backup role manager.

In some cases, the default role manager may come back online fairly quickly after a failure, which means that it may be possible for the default and backup role managers to be making leadership decisions for the distributed service in fairly close temporal proximity. To avoid potentially conflicting leadership decisions being made by the two role managers, in at least some embodiments the role assignment policy for a given service may split the set of role indicator values into two disjoint subsets: one subset (e.g., Subset-A) from which only the default role manager is allowed to assign values, and another subset (e.g., Subset-B) from which only the backup role manager is permitted to assign values. For example, if in one implementation the set of role indicator values comprises positive integers $\{1, 2, 3, 4, \ldots\}$, Subset-A may comprise the subset of odd positive integers $\{1, 3, 5, \ldots\}$ while Subset-B may comprise the subset of odd positive integers $\{2, 4, 6, \ldots\}$. Both the default role manager and the backup role manager may identify their respective subsets of assignable role indicator values (as well as other parameters of the role assignment policy), e.g., during initialization in various embodiments. The two role managers may also determine the order in which the values are to be assigned in response to successive leadership assignment (or re-assignment) requests—e.g., each role manager may store an indication of the last value from its subset that has been assigned, and select the next-highest value when a new role indicator value is to be assigned. In at least some embodiments, each role manager may also be required to ensure that a given role indicator value is only assigned once. It is noted that different comparison criterion for identifying the leader based on currently-assigned role indicator values may be employed in different embodiments, which may also impact the order in which the values are used by the role managers. For example, in one embodiment, the node with the lowest currently-assigned role indicator may be designated as the leader, in which case the role managers may issue role indicator values in descending order. In some embodiments, values other than integers may be used for role indicators—e.g., any desired type of discrete-valued token (such as non-integer numeric values, various types of non-numeric values including string or character values and the like) for which unambiguous comparison results can be obtained may be employed. The sizes of the two subsets of role indicator values may differ in some embodiments—e.g., out of a possible 10000 values, 9900 may be reserved for use by the default role manager, while 100 may be usable by the backup role manager.

In at least one embodiment, the backup role manager may only be employed in the event of a failure of the default role manager. In one such embodiment, the service nodes may also be able to detect the unavailability of the default role manager. As soon as the default role manager becomes responsive after the failure, one or more of the service nodes may again transmit leadership assignment requests to the default role manager. The default role manager may select the next leadership indicator value from its subset (Subset-A) of the role indicator values in the policy-specified order, and appoint a new leader node using its normal procedures. In some cases, the leadership decision made by the backup role manager may be overridden by the default role manager fairly quickly after the default role manager becomes operational. In at least some embodiments, even the node (e.g., SN-x in the above example) which was assigned the leader role by the backup role manager may submit a new leadership assignment request to the default role manager after the default role manager comes online. As a result, it may sometimes be the case that the same node (SN-x) may be assigned the leader role by the backup role manager using one role indicator value RIV-j from Subset-B, and then again assigned the leader role by the default role manager using a different role indicator value RIV-k from Subset-A.

Consider an example in which positive integers $\{1, 2, 3 \ldots\}$ are to be used as role indicator values, Subset-A (assignable by the default role manager) comprises the odd positive integers $\{1, 3, 5, \ldots\}$, and Subset-B (assignable by the backup role manager in the event of a failure condition) comprises the even positive integers $\{2, 4, 6, \ldots\}$. Assume that according to the role assignment protocol, the leader node is the one with the highest indicator value, and that at a point of time T1, the distributed service comprises three active nodes SN1, SN2 and SN3. When responding to a leadership assignment request, each role manager selects the next higher role indicator value which has not yet been assigned from its subset. Assume further that the respective most-recently-assigned role values for the three nodes are 53 (for SN1), 67 (for SN2) and 25 (for SN3) at time T1. Based on the role assignment protocol, SN2 is the leader at time T1.

At time T2 (after T1), the backup role manager receives a notification that the default role manager is down, and also that SN2 is down. However, the backup role manager is still able to communicate with SN1 and SN3 (which may be referred to as "surviving nodes"). In this example scenario, the backup role manager may select 68 as the role indicator value for a new leader (e.g., based on the leader role indicator value order defined in the role assignment policy), and transmit a leadership assignment message with 68 as the role indicator value to (for example) SN1. The particular surviving service node which is selected as the leader may be chosen by the backup role manager based on various criteria in different embodiments—e.g., based on some indication of the workload level of the node, based on the responsiveness of the node, based on random selection, etc. In some embodiments the surviving nodes may detect (or be notified regarding) the failure of the default role manager, and may send their own leadership assignment requests to the backup role manager. The backup role manager may, for example, select the first surviving node from which it receives such a request as the new leader in such an embodiment. The service may continue processing requests, with SN1 as the leader and SN3 as a non-leader node. In some embodiments, the backup role manager may determine which next value is to be used as the leadership indicator (e.g., 68) based on information obtained from one or more of the surviving nodes—e.g., SN1 and/or SN3 may inform the backup role manager that the last-known leader's role indicator value was 67, which may result in the choice of 68 as the new leadership value. In other embodiments, the backup role manager may keep track of the role indicator values used by the default role manager—e.g., by reading from a registry or database maintained by the default role manager—and may therefore be able to select an appropriate value for the next leadership indicator without obtaining any information from the survivor nodes. Because the subsets of role indicator values used by the default and backup role managers are disjoint, situations in which both role managers assign the same role indicator value may be avoided in various embodiments, thus reducing the probability of ambiguous assignments of leader roles.

At time T3 (after T2) in this example, SN1 and SN3 determine (e.g., via respective notifications or via messages from the default role manager) that the default role manager has come back online. Assume that SN2 has also come back online by T3 (but is no longer the leader), and has also detected that the default role manager is online. In some embodiments, some or all of the nodes may submit new leadership assignment requests to the default role manager when the latter has recovered from a failure (e.g., even if the leader designated by the backup role manager remains online/responsive). Upon receiving one such request, the default role manager may select a new value (in this example, 69) from Subset-A and provide it to the requester, thereby making the requester node the leader going forward. In at least one embodiment, the leader selected by the backup role manager may be permitted to remain leader for at least some time after the default role manager comes back online—e.g., the default role manager may not necessarily override the decision of the backup role manager.

In at least some embodiments, the default role manager may implement a lease mechanism, in which the granting of leadership has an associated lease subject to expiration. For example, in one embodiment, a leader lease period of N seconds may be used. In such an embodiment, a service node to which the leader role is assigned may be required to submit a leadership re-assignment (or lease renewal) request to the default role manager before the lease expires. Upon receiving a leadership re-assignment request while the lease remains unexpired, the assigning role manager may renew the lease for the next N seconds (or some other period) in some embodiments. In at least one embodiment, the next role indicator value may be included in the re-assignment message. In the above example, if node SN3 is assigned 69 to make it the leader after the default role manager comes back online, node SN3 may submit a re-assignment request at some time before its lease expires. In response, the default role manager may extend the lease and provide SN3 with the next role indicator value 71. In various embodiments in which a lease mechanism of this kind is used, when a leadership request is received from a given service node SN-y at the default role manager, the default role manager may check whether the leadership lease has already been granted to some other node and has not yet expired. If some other node SN-v is the leader and the lease SN-v remains unexpired, the leadership assignment request may be rejected.

A number of variations of the basic scheme outlined above for improving the robustness or stability of leader selection may be implemented in various embodiments. In some embodiments, for example, the number of possible roles from which one role may be assigned to various service nodes may exceed two (e.g., instead of leader vs. non-leader roles, a node may be assigned role A, role B or role C, with each of the three roles corresponding to the responsibility for fulfilling different categories of service requests), and a similar approach of using disjoint subsets of role indicators may be used. In one embodiment, multiple layers of redundant role managers may be used—e.g., a first backup role manager and a second backup role manager (with respective subsets of role indicator values) may be employed, with the second backup role manager assigning leadership in the event that the first backup role manager fails. A given role manager may serve as a default (or backup) role manager for more than one service in some embodiments.

Example System Environment

FIG. 1 illustrates an example system environment in which a subset of role indicator values may be reserved for leadership assignment by a default role manager of a distributed service, according to at least some embodiments. As shown, system 100 comprises a distributed service 132 with a plurality of service nodes (SNs) 135, including SN 135A, 135B, 135C and 135D. Each SN 135 performs responsibilities associated with one of two roles: a leader role or a worker (non-leader node); that is, each SN may be capable of executing the responsibilities of either role in the depicted embodiment. In the state of distributed service 132 illustrated in FIG. 1, SN 135B is the leader, and the other SNs 135A, 135C and 135D are worker nodes. The node to which the leader role is assigned may be responsible for fulfilling one or more categories of service requirements. For example, the leader node may receive service requests generated by clients of the service 132. Corresponding to a given client request, the leader node may prepare and transmit one or more corresponding work requests (WRs) 145, such as WR 145A, 145B or 145C, to the worker nodes, indicating tasks or operations to be performed to fulfill the service request. In some embodiments, depending for example on the nature of the service 132, the work requests 145 may be generated by the leader node without receiving requests from clients as such: for example, the leader node may examine a database or queue indicating tasks to be implemented, and generate work requests based on the contents of the database or queue. The SNs may communicate with each other and/or with entities outside service 132 via any desired type of networking protocol in various embodiments, such as IP (Internet Protocol), TCP (Transmission Control Protocol), UDP (User Datagram Protocol), proprietary or custom protocols, and the like.

The leader role for distributed service 132 may be assigned dynamically in system 100 according to a role assignment policy 128. Under normal operating conditions (e.g., in the absence of device failures or network partitioning events), leader assignment decisions may be made at least in part by a default role manager (DRM) 102. In some embodiments, each of the SNs 145 may keep track of the current leadership assignment, e.g., by subscribing to notifications generated by the DRM 102. Under certain threshold conditions, a worker SN may transmit a leadership assignment request to the DRM 102, requesting that the role of leader be granted to it (the sender of the request). A number of different threshold conditions may trigger such a request: e.g., if the worker SN cannot communicate successfully with the most-recently-appointed leader, if the worker SN receives a notification that the leader has failed or become unavailable, or if no notification regarding leadership assignment is received for a configurable time interval. Depending on the response of the DRM 102, the worker SN may either assume the leader's responsibilities, or continue in its role as a worker.

In the embodiment depicted in FIG. 1, positive integer values are employed as role indicator values (RIVs) 125 in accordance with role assignment policy 128 implemented for distributed service 132. The set of usable role indicators is subdivided into two non-overlapping subsets: subset 126A, comprising odd positive integers $\{1, 3, 5, \ldots\}$ which can be used by the default role manager, and subset 127B, comprising even positive integers $\{2, 4, 6, \ldots\}$ which cannot be used by the DRM 102. Subset 126B may be used by other authorized entities such as a backup role manager (BRM) 122 to assign leader roles to the SNs under certain conditions (e.g., failures or apparent failures of the kind described below). Based on the rules of the role assignment policy 128, the SN 145 with the highest RIV among the operation nodes of the distributed service 132 is considered the leader, and the remaining SNs are considered workers. In general, a variety of comparison criteria may be used to determine which node is to be considered the leader; in some embodiments in which integer RIVs are used, for example, the lowest RIV may indicate the leader instead of the highest RIV. The role assignment policy 128 may also specify the leader RIV selection order 129 (e.g., that RIVs are to be selected in ascending order in response to successive valid leadership requests) and/or one or more optional lease-related parameters 130 in the depicted embodiment. In one embodiment, the role assignment policy may also include various timeout parameters which are to be used by service nodes to determine if or when to send leadership assignment requests, re-assignment requests and the like. At least some of the parameters of the role assignment policy 128 may be accessible to the backup role manager 122 and/or the SNs 145 in the depicted embodiment, in addition to be being known at the default role manager.

As mentioned earlier, many different SNs may request leadership assignment over the lifetime of the service, and some of them may have received RIVs in response to such requests. In the scenario illustrated in FIG. 1, for example, SN 135A has received an RIV 51 in the past, SN 135D has received 33 as an RIV, SN 135B currently has the RIV 101, while SN 135C has not received an RIV (as indicated by the null value shown for SN 135C's RIV). Per the role assignment policy, SN 135B is currently the leader node because its RIV is higher than that of any of the other SNs. In the depicted embodiment, the work requests 145 may include the sender's RIV, e.g., as evidence intended to prove that the sender is the leader. Thus, each of WRs 145A, 145B and 145C may include the RIV 101 of the sender SN 135B. Upon receiving a WR 145, in some embodiments a worker node such as 135A, 135C or 135D may first check whether it has received an indication that the sender of the WR is not the leader. Such an indication may be received, for example, as a notification from the DRM 102 (or the BRM 122), or in the form of a work request with a higher RIV (which may indicate a different leader). For example, if, at the time that worker node 135C receives WR 145A containing the sender RIV 101, worker node 135C has already received a work request with a sender RIV greater than 101, worker node 135C may reject WR 145A on the grounds that the sender of WR 145A is not the leader.

SN 135B may send a series of leadership assignment or renewal requests 155 to the DRM 102 in the depicted embodiment. For example, the initial granting of the leader role may have an associated lease with a specified expiration time, and SN 135B may request extensions of the lease to retain its role as leader. When it receives a particular leadership assignment request 155, the DRM 102 may determine whether the requester SN already has a valid (e.g., unexpired) lease. If so, a new RIV 156 may be obtained from subset 126A and transmitted as an indication that the leader role can be retained by the requester SN 145. If the requester SN does not have a currently valid lease on the leader role, the DRM 102 may take one of two actions. If some other SN has a valid lease on the leader role, the request 155 may be rejected. In some implementations, a rejection message identifying the current leader and the most recently-assigned RIV may be transmitted to the rejected requester SN. In contrast, if no other SN has an unexpired lease, the DRM 102 may select the next leadership RIV (e.g., the RIV in subset 126A which is immediately higher than the highest previously-assigned RIV) based on the selection order 129, and transmit that RIV to the requester SN to indicate that the requester has been designated as the new leader node. In at least some embodiment, whenever a decision regarding the transfer or renewal of the leader role is made by the DRM 102, notifications regarding the decision (e.g., indicating the identity of the new/re-assigned leader, and/or the RIV assigned) may be provided to some or all of the other nodes of the service. In the scenario as shown in FIG. 1, if SN 135B's lease expires and DRM 102 receives a leadership assignment request from SN 135A, for example, the DRM may choose 103 as the next leadership indicator value, transmit it to SN 135A, and notify at least some of the remaining SNs 135B-135D regarding the change.

In the event that DRM 102 fails or becomes unreachable/disconnected, and the current leader SN 135B also fails or becomes unreachable, while at least one SN does remain operational and reachable from the BRM 122, the BRM may temporarily take over as the leader selector from the DRM. In such a situation, the BRM 122 may select the appropriate RIV from its subset 126B which can override the most recent leadership decision made by the DRM prior to the failures, and use that RIV to designate one of the surviving SNs as the new leader. Details regarding the detection and recovery from such failure scenarios are provided below in the context of FIG. 2-FIG. 5.

In some embodiments, a role manager such as the DRM 102 (and/or the BRM 122) may itself be implemented as a distributed collection of nodes. In FIG. 1, for example, DRM 102 comprises a plurality of voting member nodes such as 110A, 110B and 110C. A quorum-based protocol involving the participation of at least a specified number of the voting members 110 may be employed when making role assignment decisions at DRM 102 (e.g., the decision as to whether a positive or negative response should be generated to a leadership assignment request) in such an embodiment. An inability to meet the quorum (i.e., to communicate with the minimum number of voting members 110 needed for the quorum) may be considered a failure of the DRM 102. The DRM 102 may be considered an example of a distributed state manager, at which contents of a logical state registry 115 may be replicated at some or all of the voting members 110. The logical state registry 115 may be used, for example, to store records of the leadership decisions made at the DRM, such as the last (most recent) RIV from subset 126A which was assigned to an SN. Other metadata associated with the distributed service 132 and/or the role assignment policy may also be stored in the registry in various embodiments. In at least some embodiments, entities such as the SNs 145 and/or the BRM 122 may subscribe to notifications regarding changes committed to registry 115, and may thereby keep up with the leadership decisions made at the DRM 102. In some embodiments, the DRM may not be implemented as a distributed subsystem and a quorum-based protocol may not be used for leadership decisions.

In various embodiments, the distributed service 132, the DRM 102 and the BRM 122 may be implemented using the resources of a provider network. Networks set up by an entity such as a company or a public sector organization to provide one or more services (such as various types of cloud-based computing or storage services) accessible via the Internet and/or other networks to a distributed set of clients or customers may be termed provider networks in this document. Some provider networks may also be referred to as "public cloud" environments. A provider network may typically include several large data centers hosting various resource pools, such as collections of physical and/or virtualized computer servers, storage devices, networking equipment, security-related equipment and the like, needed to implement, configure and distribute the infrastructure and services offered by the provider. The provider network may include various internal resource monitoring and/or health monitoring services, which may be useful in detecting and/or responding to failures potentially affecting the distributed service in various embodiments as discussed below.

Failure-Triggered Leader Selection Event Sequence

FIG. 2-FIG. 5 collectively illustrate an example of a sequence of events associated with a failure scenario during which the default role manager of a distributed service becomes temporarily unavailable, according to at least some embodiments. The sequence of events is illustrated relative to the starting state illustrated in FIG. 1—i.e., the nodes of the distributed service 132 are assumed to be in the respective states shown in FIG. 1 just before the events shown in FIG. 2 occur. To simplify the presentation, while role assignment policy 128 remains in effect in the scenarios illustrated in FIG. 2-FIG. 5, some of the elements of policy shown in FIG. 1 are not repeated in FIG. 2-FIG. 5.

Figure 2:
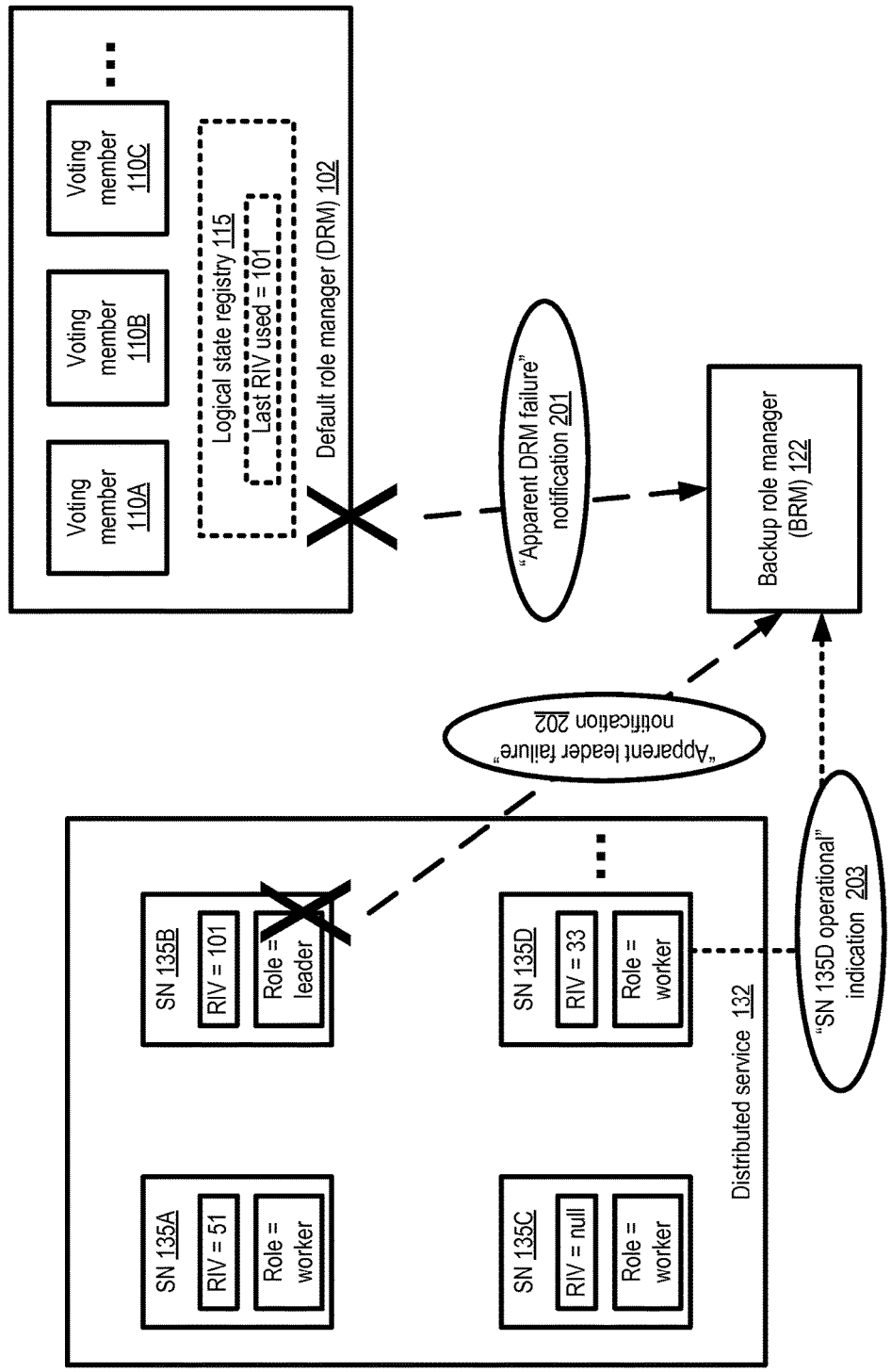
FIG. 2-FIG. 5 collectively illustrate an example of a sequence of events associated with a failure scenario during which the default role manager of a distributed service becomes temporarily unavailable, according to at least some embodiments.

In FIG. 2, the BRM 122 has detected (at least) two failures, as well as an indication that at least one SN (145D) remains operational. In various embodiments, the data centers at which the SNs and the DRM are implemented may comprise various health monitoring and/or resource monitoring facilities. Such facilities may for example periodically "ping" each monitored resource (such as the SNs and the DRM), send periodic heartbeat requests to the monitored resources and keep track of how responsive the resources are to the heartbeats, or use various other techniques to detect possible failures of various kinds. A BRM 122 may subscribe to notifications or alerts which may be generated by such monitoring facilities, and/or the BRM may examine logs generated by the monitoring entities. As shown, the BRM may receive a notification 201 of an apparent failure of the DRM 102 (as indicated by the "X" symbol at the DRM), and a notification 202 of an apparent failure of the leader SN 135B (as indicated by the "X" symbol at SN 135B). The failures may be considered "apparent" rather than confirmed because a given failure detection algorithm may sometimes result in false positives—for example, while communications between the health monitoring entity and the resource being monitored may have timed out or met the criteria for triggering a failure notification, this may have been due to transient and unpredictable network delays or events, and not due to a persistent failure of any particular device or network link. Regardless of whether the failures indicated in notifications 201 and 202 are false positives or not, the BRM may initiate a response to the possible combination of failures as outlined below, with the overall goal of continuing to meet the requirements of distributed service 132.

It is noted that the failure of either the leader node alone, or the DRM alone, may not necessarily trigger operations by the BRM 122 in at least some embodiments. For example, if the DRM remains operational and the current leader node fails, a new leader may be selected (e.g., in response to leadership assignment requests sent by one or more of the remaining nodes) fairly quickly, without much impact (or any impact) on the clients of the service 132. Similarly, if the DRM becomes unavailable, but the leader SN remains operational, the service may continue normal operations with respect to meeting service requirements, at least as long as no leadership change is required. In embodiments in which the DRM comprises a plurality of voting members which collectively implement a quorum-based protocol to commit state change decisions, a network disruption which results in the inability to reach a quorum (e.g., a network partitioning in which none of the partitions has enough members to form a quorum) may constitute one of the scenarios that renders the DRM "failed" or unavailable.

If both the failures shown in FIG. 2 happen to occur, the BRM 122 may be able to keep the service 132 operational as long as at least one SN remains functional. If an indication 203 that (for example) SN 135D has not failed and remains operational is available at BRM 122, such a node may be selected as the next leader. The indication 203 may be obtained using any of a number of different approaches in various embodiments—e.g., the health monitoring service may inform the BRM 122 that SN 135D is up and running, or SN 135D may itself communicate with BRM 122 (e.g., by sending a leadership assignment message).

Figure 3:
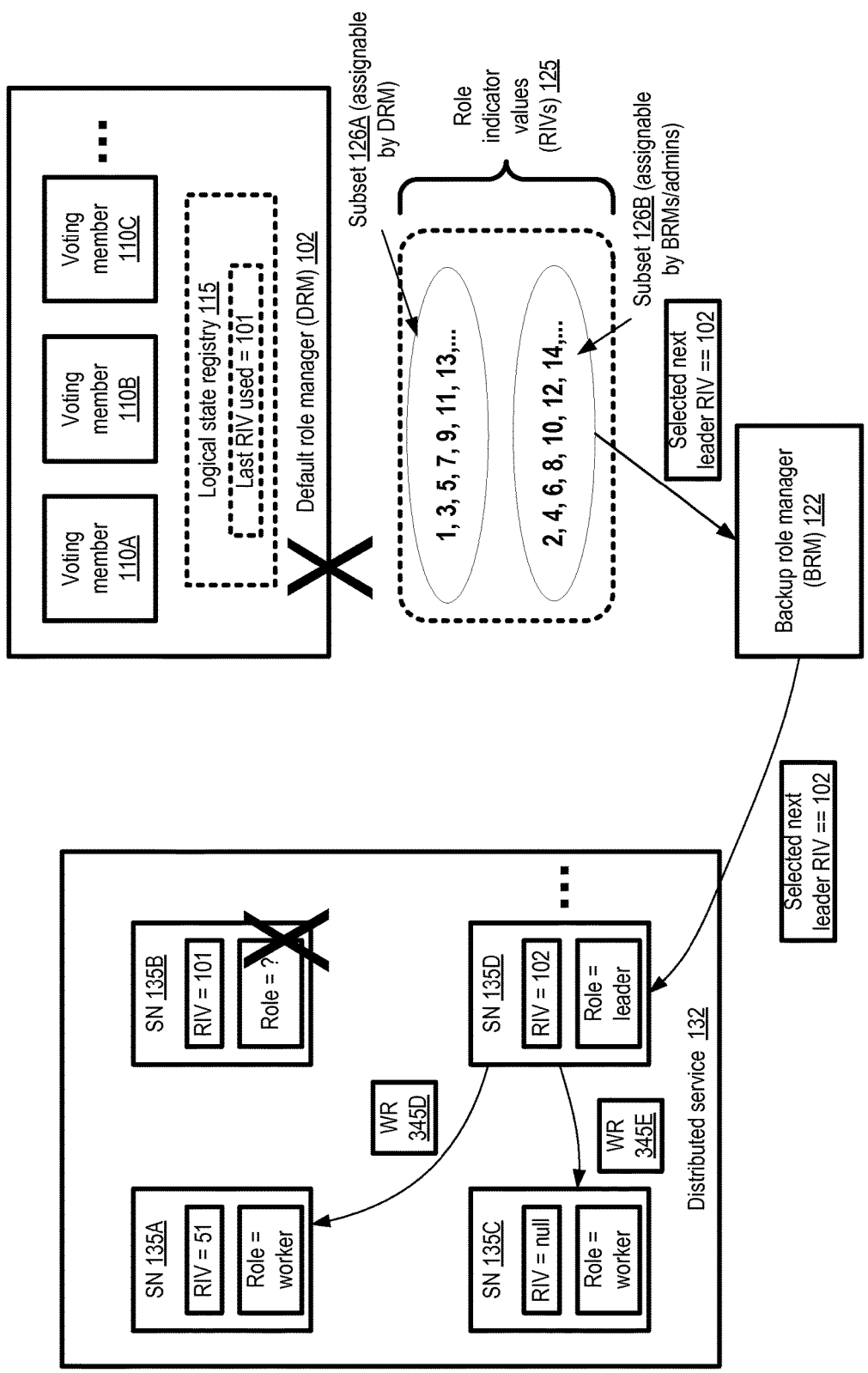

Having determined that at least one SN (135D) capable of performing the leadership responsibilities has not failed, BRM 122 may implement the actions indicated in FIG. 3. The actions may include obtaining a new RIV from subset 126B, such that the assignment of the RIV to the surviving SN 135D would make SN 135D the leader node. In some embodiments as mentioned earlier, the BRM may already be aware (e.g., based on notifications generated by the DRM) that the value 101 was the most recently-assigned RIV by the DRM prior to the failure. In other embodiments, the BRM 122 may obtain the value of the most-recently-used RIV from one or more surviving SNs—e.g., some or all of SNs 135A, 135C and 135D (which did not fail and are therefore considered surviving nodes) may inform the BRM of their respective views of the RIV which was assigned to the leader node. As shown in FIG. 3, given that SN 135C had been assigned the value 101, BRM 122 may select 102 as the new leader RIV based on the role assignment policy of the service, and transmit that new leader RIV to the selected SN 135D which is to take over the leadership responsibilities at least temporarily. If the BRM determines that several leadership-capable SNs such as 135A, 135C and 135D are operational, it may choose a particular one of them as the next leader based on any of various criteria. For example, one of the surviving SNs may be chosen at random, or (if workload or performance data is available) the least loaded or most responsive surviving SN may be chosen as the next leader.

It is noted that, because the subsets 126A and 126B are disjoint, it cannot be the case that the same next leader RIV is selected by both the DRM and the BRM in the embodiments depicted in FIG. 1-FIG. 5. Furthermore, because of the interleaving in the subset 126A and 126B RIVs (e.g., the first RIV of subset 126B is one greater than the first RIV of subset 126A, the second RIV of subset 126A is greater than the first RIV of subset 126B, etc.), if the two role managers alternately select leaders using the next unused value in ascending order from their respective subsets, each selection made by one role manager will overrode the previous selection made by the other role manager. As mentioned earlier in the context of FIG. 1, the order in which leader RIVs are to be used from the subsets 126A and 126B may be indicated or defined in the role assignment policy for the distributed service 132. Such interleaving may not be required in at least some embodiments. In at least one embodiment, when selecting the next leader RIV in a scenario similar to that shown in FIG. 3, the BRM 122 may skip some of the RIVs in its subset 126B which may have been used to change the leader. For example, instead of using 102 to override the previous leader assignment (which used 101 as the RIV), the BRM may use 112, 122 or some higher value. Such an approach may be used to try to avoid scenarios in which the DRM has already assigned values such as 103, 105 etc., which are close to the last leader RIV known to BRM 122. Thus, at least in some embodiments in which integer-based RIVs are used, the particular pair of RIVs used for consecutive leadership assignments need not necessarily be consecutive integers—e.g., 101 may have been used as the RIV by DRM 102 prior to its failure, while 122 may be used as the RIV by the BRM in response to detecting failures of the kind shown in FIG. 2.

Figure 4:
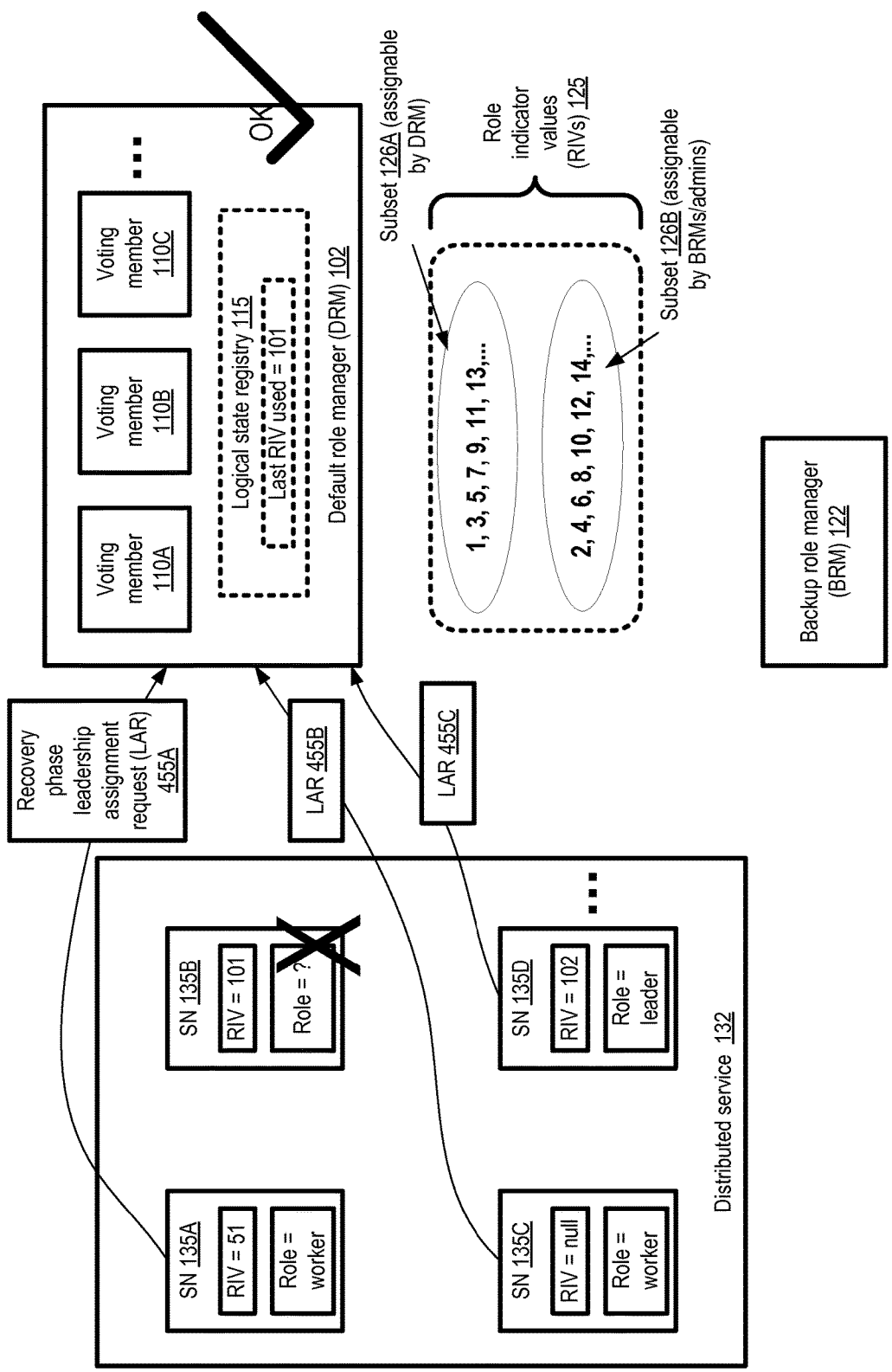

At the point of time corresponding to FIG. 4, the DRM 102 has come back online, as indicated by the checkmark symbol with the "OK" label, while SN 135B remains unavailable. SN 135D, which was designated as the leader based on role indicator value 102 provided by the BRM 122, remains the leader. The SNs 135 may detect that DRM 102 has become available and responsive. As part of a recovery protocol of the distributed service 132, some or all of the SNs may transmit respective leadership assignment requests (LARs) 455 (such as 455A, 455B or 455C) to the DRM 102 in the depicted embodiment. Each LAR may indicate that the corresponding sender SN is available and willing to assume the leadership role. In one embodiment, at least one LAR may indicate that the BRM has assigned RIV 102 to SN 135D, which may help the DRM to select an appropriate RIV to override (or re-affirm) the BRM's leader selection. In some cases, LARs 455 may be transmitted despite the fact that the BRM-appointed leader (SN 135D) remains online; that is, in scenarios in which the DRM is accessible, leader selection by the DRM may be preferred to leader selection by the BRM in at least some embodiments. The use of the BRM 122 may be considered a short-term technique to be used only as a last resort in such embodiments, with leader assignment responsibilities to be handed back to the DRM as soon as possible. In some implementations, some or all of the operational SNs 135 may not send recovery phase LARs 455 to the DRM—e.g., only those SNs (if any) which are not aware that SN 135D has been granted the leader role may send LARs 455. In other embodiments, the BRM-assigned leader may remain the leader for at least some time after the DRM recovers (e.g., until a leadership lease granted by the BRM 122 expires). In some embodiments, the BRM 122 may not grant or renew leases in the manner that the DRM does. In such an embodiment, the granting of the leader role to SN 135D by the BRM 122 (or by an administrator) without a lease may be considered a temporary measure, with lease-based leadership to be resumed as soon as the DRM becomes responsive.

Figure 5:
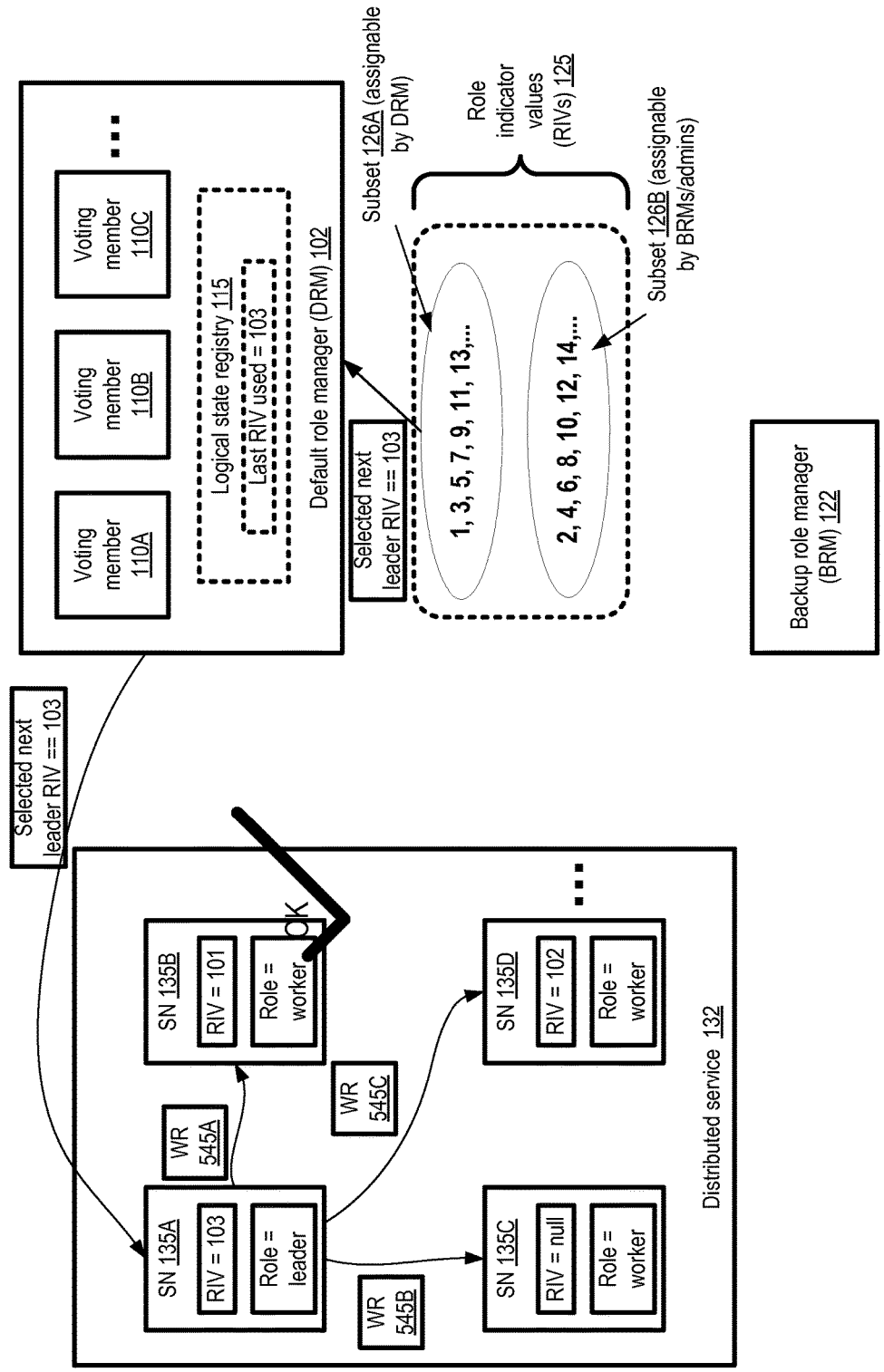

In the state of the system as depicted in FIG. 5, the DRM 102 has responded to the LAR from SN 135A with a new RIV (103) which is higher than the RIV used most recently by the BRM 122. The DRM 102 may have responded to the LAR 455A from SN 135A because it was the first LAR received among LARs 455A-455C, for example. In some embodiments, the DRM 102 may not necessarily select the first SN (from which an LAR is received after the DRM recovers from its failure) as the next leader; instead, the most lightly-loaded SN (based on metrics obtained by the DRM or provided by the SNs) may be chosen, or the SN which was most recently a leader (e.g., SN 135D) may be re-selected as leader. The SN which receives the new leader RIV 103 may start performing the leader responsibilities, e.g., by sending work requests (WRs) 545 (such as 545A-545C) to the other nodes. As indicated by the checkmark symbol with the "OK" label, node 135B may also come back online and assume the role of a worker node. It is noted that the order of the recovery events following a multi-location failure of the kind indicated in FIG. 2 may differ from that shown in FIG. 3-FIG. 5: for example, SN 135B may come back online before the DRM resumes its operations. In the latter scenario, if SN 135D has been designated as the leader using RIV 102 at the time that SN 135B recovers, SN 135B may revert to worker status because its RIV (101) is no longer the highest RIV among the SNs. In one implementation, if SN 135B becomes operational before BRM 122 has chosen a new leader, and if BRM 122 discovers that SN 135B has come back online, BRM 122 may allow SN 135B to continue as the leader. As mentioned earlier, in various embodiments the basic algorithm for selecting and assigning leader role indicator values discussed in the context of FIG. 1-FIG. 5 may be extended to environments in which service nodes may be assigned roles selected from a set with more than two different roles (e.g., a set which does not contain just the roles "leader" and "non-leader").

Example Distributed Role Manager Implementation

Figure 6:
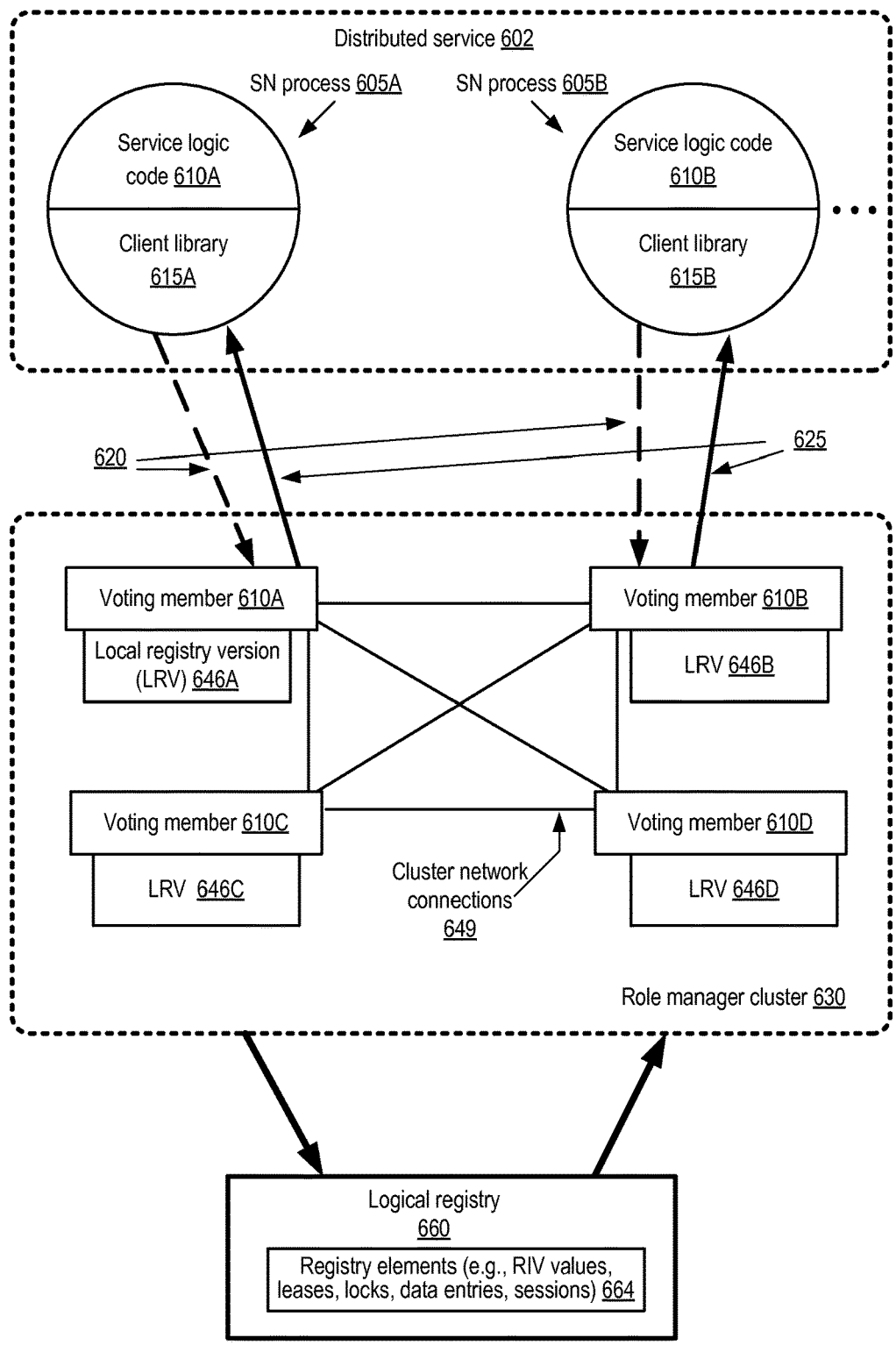
FIG. 6 illustrates an example of a role manager implemented as a cluster of voting members, according to at least some embodiments.

FIG. 6 illustrates an example of a role manager implemented as a cluster of voting members, according to at least some embodiments. Such an architecture may be used for the default role manager in some embodiments, and/or for a backup role manager. The role manager comprises a server cluster 630 of four voting members 640A, 640B, 640C and 640D in the depicted embodiment. Generally speaking, such a cluster may be employed for managing the state of various types of distributed applications, and not necessarily just for role management purposes for distributed services which require leader selection. At least some of the voting members 640 may be instantiated at different hosts than others in some embodiments. Distributes service 602 may comprise a plurality of service node (SN) processes 605 (e.g., 605A and 605B), each comprising one or more threads of execution. In the illustrated embodiment, an SN process 605 may comprise an execution of service business logic code 610 and role manager client library components 615. SN process 605A executes service logic code 610A and client library components 615A, and SN process 605B executes service logic code 610B and client library components 615B. A client library component 615 may in some embodiments comprise a software library that exposes one or more programmatic interfaces (e.g., interfaces for leadership assignment requests, leadership re-assignment requests, or queries used to identify the current leader or the most recently used RIV) to service logic code 610 for interacting with the cluster 630.

A given SN process 605 may communicate with the role manager via any one of the voting members 640 in the depicted embodiment. As shown, the various voting members 640 may communicate with one another via cluster network connections 649. These network connections may be implemented using various types of networks (e.g., Myrinet, Ethernet, Gigabit Ethernet, etc.) in various topologies (e.g., ring, grid, Torus, bus, etc.). In some embodiments, a role manager may be implemented on a fully-connected cluster of computers, where each voting member is on a different physical machine in the cluster, executes a separate instance of the role manager software, and can communicate directly with every other voting member in the cluster via a network connection. However, those skilled in the art will appreciate that various other configurations are possible using different physical and/or virtual machines, connected by different network types and/or topologies such as the topologies described above.

The voting members 640 may work together to maintain state information pertaining to respective role assignment policies for one or more distributed services in one or more logical registries 660. The logical registry 660 may not necessarily be implemented as a separate physical entity, but rather, as a logical entity implemented across multiple voting members of the role manager. For example, in the depicted embodiment, each voting member 640 may keep a respective local registry version (LRV) 646 (e.g., LRV 646A at member 640A, LRV 646B at member 640B, and so on) comprising a portion or all of the contents of logical registry 660. Through a consensus or quorum-based protocol, the voting members may agree on state transitions for each voting member to apply to its LRV 646, thereby collectively maintaining a single logical registry 660. Each voting member 640 may thus maintain a cached copy of the registry that is valid as of the last registry transition (i.e., update to state information) known at the member. In some embodiments, each transition may be associated with a registry logical timestamp, such as in a monotonically increasing 64-bit integer or counter. This timestamp may be a physical or logical time in different embodiments, and may be referred to as the "role manager time". In embodiments where the role manager time is maintained as a counter, it may be incremented each time the registry is updated in some implementations, e.g., each change to the logical registry may result in a change to the role manager time, and each change in the role manager time may indicate that at least one element of the registry was updated. The registry logical timestamp may also be referred to as a commit sequence number in some embodiments, and respective commit sequence numbers may also be associated with accepted state transitions. In some embodiments, each voting member 640 may maintain its own local registry timestamp, indicative of the most recent transition of the logical registry that is reflected in the local LRV. At any point in time, in some implementations, the value of the local registry timestamp at a given voting member 640 may differ from the value of the local registry timestamp of another voting member; however, if and when two voting members have the same local registry timestamp values, the data in their respective LRVs 646 may be identical (i.e., both local LRVs may be guaranteed to have applied the same set of updates).

In some embodiments, the logical registry 660 may include several types of elements and associated metadata, such as role indicator values (e.g., the most recently assigned RIV, or yet-to-be-assigned RIVs of the subset designated for use by the role manager), leases, lock objects, data entries, session objects representing connections to SNs 605, and the like. In one embodiment, the role manager may maintain multiple logical registries to store data relevant to respective distributed services and/or other clients. The cluster 630 may act as a mediator between the SN processes 605 and one or more logical registries 660 in the depicted embodiment. An SN process 605 may interact with a logical registry 660 by submitting transactions 620 (e.g., leader assignment requests) to the role manager cluster 630. In some embodiments, requests to read state information may also be submitted as transaction requests—that is, a given transaction may comprise reads, writes, or reads and writes. Through a read transaction, an SN process may read information such as the identity of the current leader SN, assigned RIVs, leases, locks, entries, or sessions from the logical registry 660. Using a write transaction, an SN process 605 may update information in the logical registry 660. The role manager may determine the outcome of various transactions requested by clients such as SN processes 605, e.g., using a majority vote of a quorum of voting members 640 in the case of client-requested modifications. Event notifications (e.g., as indicated by the arrows labeled 625) indicating the transaction outcomes may be provided to interested SN processes 605 in at least some embodiments. In some embodiments, a role manager for a distributed service may be implemented in a non-distributed manner; that is, a cluster of the kind shown in FIG. 6 may not be required.

Lease Mechanism

Figure 7A:
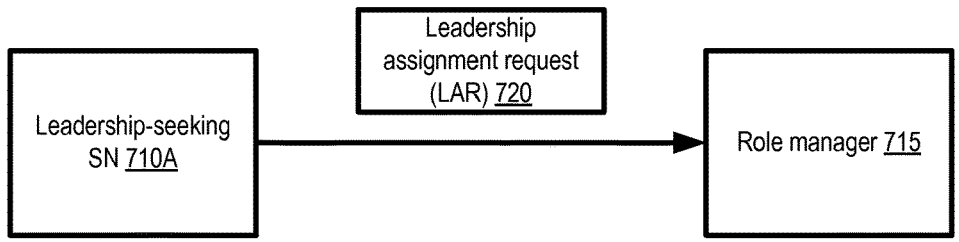
FIG. 7*a*-7*d* collectively illustrate example interactions between a service node and a role manager which assigns leases and role indicator values, according to at least some embodiments.
Figure 7B:
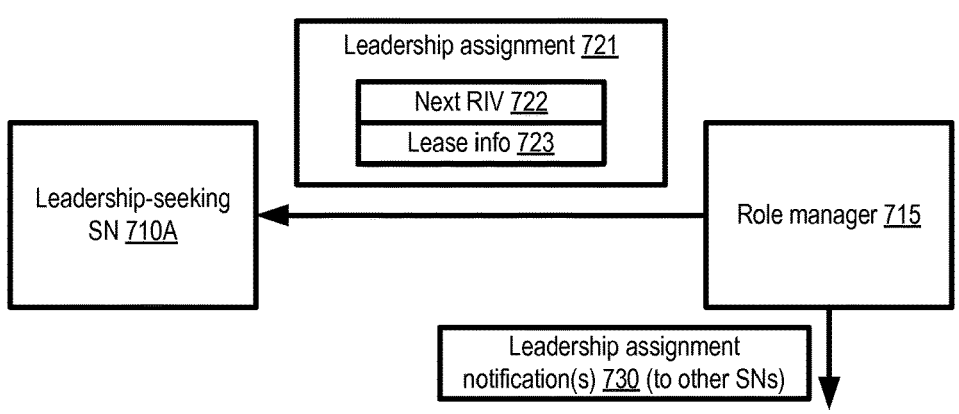

As indicated earlier, a combination of role indicator values and leases may be used for leader role management in some embodiments. FIG. 7a-7d collectively illustrate example interactions between a service node and a role manager which assigns leases and role indicator values, according to at least some embodiments. In FIG. 7a, a leadership-seeking service node 710A (i.e., a service node which is not currently the leader) sends a leadership assignment request (LAR) 720 to a role manager 715. The role manager 715 may determine whether any other service node is currently designated as the leader (e.g., by checking whether a leadership lease which is currently valid or un-expired has been assigned to some other service node). If no such leader is found, the role manager may send back a leadership assignment message 721 to the node 710A, as shown in FIG. 7b. The assignment message 721 may include the next leader RIV 722 selected from the role manager's subset of assignable RIVs in an order specified in the role assignment policy applicable to the service to which node 710A belongs. In at least some embodiments, the assignment message 721 may also comprise lease information 723, indicating for example the term of a lease associated with the leadership assignment, an identifier of the lease (which may for example be used to submit queries to the role manager regarding the lease), etc. In one embodiment, the validity period or term of the lease may be known to the service nodes (e.g., as a configuration parameter or a hard-coded value), in which case lease information 723 may not be included in the assignment message 721. The role manager 715 may also generate one or more notifications 730 (e.g., directed to service nodes other than 710A) indicating that leadership has been granted to service node 710A in various embodiments. In some embodiments, such notifications 730 may include RIV 722 and/or lease information 723.

Figure 7C:
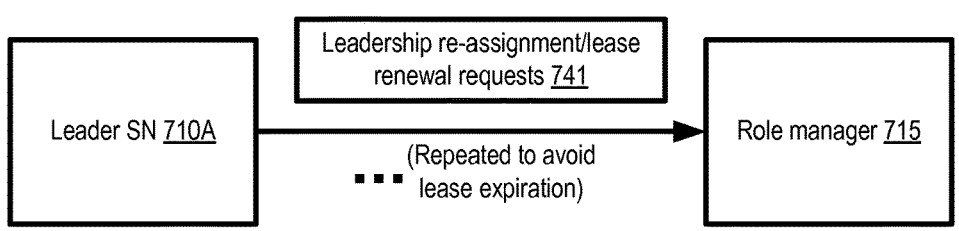
Figure 7D:
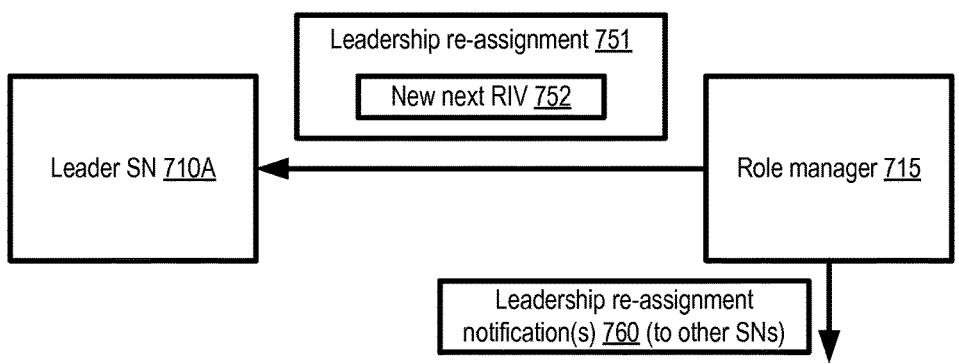

As shown in FIG. 7c, the service node 710A which has assumed the leader role may transmit a leadership re-assignment (or lease renewal) request 741 to the role manager 715 at some point before its lease expires. Such requests may be sent periodically while the node remains leader in various embodiments. In some embodiments, the interval between successive lease renewal messages may be a configurable parameter (e.g., expressed as a fraction of the lease validity period, or otherwise defined in the role assignment policy). For example, if the lease validity period is 20 seconds (which may itself be a configurable parameter), and the renewal request interval is set to 25% of the lease validity period, re-assignment requests may be scheduled once every 5 seconds. Upon receiving a leadership reassignment or lease renewal request, the role manager 715 may check to ensure that the lease remains un-expired and has not been assigned to some other service node. If the leadership assignment can be extended for the requesting node, a re-assignment message 751 may be sent to node 710A in the depicted embodiment, as shown in FIG. 7d. In at least some embodiments, the role manager may select a new next leader RIV 752 from its subset of RIVs, and include that RIV in the re-assignment message 751. For example, if the role manager's subset of assignable RIVs comprises odd positive integers {1, 3, 5, . . . }, the highest RIV among the service nodes designates the leader, and the previous RIV assigned to node 710A was 1331 in FIG. 7b, 1333 may be selected as the new RIV in response to a first re-assignment request, 1335 may be selected as the new RIV selected in response to the second re-assignment request, and so on. Other service nodes may be informed regarding the re-assignments via notifications 760 in at least some embodiments.

In one embodiment in which work request messages sent from leader nodes (or service nodes which are under the impression that they are the current leaders) include the role indicator values assigned to the senders of the work request messages, the values indicated in the work request messages may serve as implicit notifications of leadership—that is, the role manager may not necessarily transmit leadership related notifications to the non-leader nodes. Even in embodiments in which such notifications are sent by the role manager, the receipt of such notifications at any given node may not be essential to the correctness of the operations of the distributed service. For example, consider a scenario in which a given non-leader node SN-w fails to receive a notification that a different node SN-a has been made the leader using a particular role indicator value RIV-j. Assume that SN-w is aware that the highest RIV among the operational service nodes indicates leadership. When Sn-w receives a work request containing a sender's role indicator RIV-s, SN-w may simply check whether RIV-s is equal to or higher than the RIV in any previously-received work request at SN-w. If RIV-s meets this criterion, Sn-w may initiate the requested work. If and when SN-a sends a work request to SN-w, SN-w may detect that SN-a has been selected as the leader based on comparing RIV-j with the RIVs contained in previously-received work requests.

Methods for Leader Selection for Distributed Services

Figure 8:
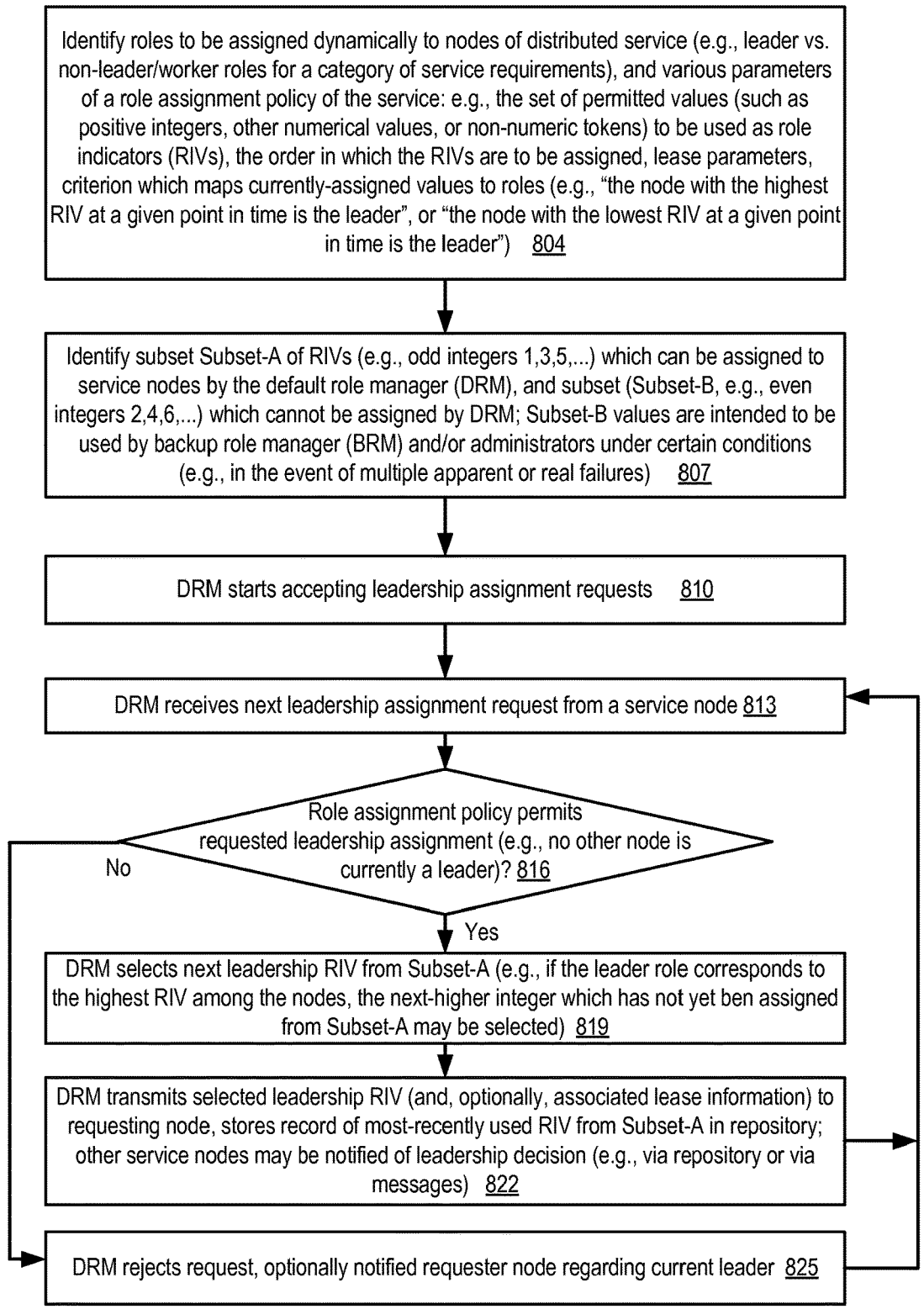
FIG. 8 is a flow diagram illustrating aspects of operations that may be performed by a default role manager of a distributed service, according to at least some embodiments.

FIG. 8 is a flow diagram illustrating aspects of operations that may be performed by a default role manager of a distributed service, according to at least some embodiments. As shown in element 804, the default role manager (which may be implemented at one or more computing devices) may identify a collection of possible roles which are to be granted dynamically to the nodes of a distributed service, as well as various parameters or elements of a role assignment policy of the service. The roles to be used for a given distributed service may, for example, include leader versus worker (non-leader), workflow coordinator versus workflow task implementer, and so on. For some services, only two roles may be defined, while for other services, multiple roles may be defined. The default role manager may determine a set of values (such as positive integers, non-integer numerical values, or other tokens which can be ordered monotonically and compared efficiently) to be used as role indicator values (RIVs) in an order (e.g., ascending or descending order) defined in the policy. A comparison criterion or rule which indicates how the currently-assigned set of RIVs can be mapped to the roles may also be determined in the depicted embodiment. Such a comparison criterion may comprise, for example, the logical equivalent of "the service node which has the highest RIV is the leader, and the rest of the nodes are non-leaders", or "the service node with the lowest RIV is the leader". In various embodiments, the comparison criterion may be used at any given service node (or at the role manager) based on the latest information available, which need not necessarily be synchronized with the information available at a different service node. Thus, it may be the case that at a given point in time, a node SN-a may be considered the leader by another node SN-b, while a different node SN-c may be considered the leader by a fourth node SN-d (based on delays in notifications, for example). The correctness of the operations of the distributed service may not rely on all the nodes' necessarily being synchronized with respect to leadership status information in such embodiments. If the work requests of the service comprise state transfer information, for example, such that any given work request can be fulfilled based on the contents of that work request alone, the fact that two non-leader nodes may temporarily consider different nodes to be the current leader may not be a problem. Eventually, when work requests with the latest leadership information (or other notifications) reach a service node with a mistaken view of the current leadership, the mistaken view would be rectified.

In at least one embodiment, the default role manager (and/or other components of the system such as the backup role manager and the service nodes) may also determine various leadership lease related parameters. Such parameters may include, for example, how frequently leadership leases have to be renewed by the current leader, the lease expiration interval (which may differ from the target interval between successive lease renewals), the duration after which a new leadership assignment request should be generated by a non-leader node which has not received leadership notifications for some time, and so on.

The default role manager may identify a first subset (Subset-A, such as odd integers 1, 3, 5, . . . ) of the RIVs which are available for assignment by it (the default role manager), and another subset (Subset-B, such as even integers 2, 4, 6, . . . ) that are not be used by the default role manager (element 807). Subset-B RIVs may be intended for use by other entities (such as a backup role manager implemented at one or more computing devices, and/or administrators) under certain conditions such as multiple apparent failure scenarios of the kind discussed above with reference to FIG. 2. The sizes of the two subsets may differ in some embodiments—e.g., fewer RIV values may be assignable by a backup role manager than are assignable by the default role manager. The operations corresponding to elements 804 and 807 may comprise part of the initialization procedure for the default role manager, the backup role manager and/or the distributed service in some embodiments.

As shown in element 810, the default role manager may start accepting and processing leadership assignment requests (or other types of role assignment requests in scenarios in which roles other than leaders and non-leaders are assignable) from service nodes after the parameters of the role assignment policy have been identified in the depicted embodiment. In response to receiving the next leadership assignment request from a particular service node (element 813), the default role manager may verify that granting the leader role to the requesting service node is permitted by the role assignment policy of the service (element 816). If a different node is currently the leader, for example, the request may be rejected (element 825). The rejected requester may be notified regarding the identity and/or RIV of the current leader in some embodiments. In embodiments in which a lease with an expiration period is granted with respect to the leader role, the default role manager may check whether the node to which the leader role was most recently assigned has an unexpired lease in operations corresponding to element 816. If the lease has expired, the default role manager may conclude that there is no current leader, and so the leader role may be assignable to the requester. In some embodiments, conditions which are not lease-related may determine whether the requesting service node should be permitted to become the leader—e.g., some nodes may only be considered qualified for leadership if other more qualified nodes are unavailable. It is noted that in at least one embodiment, the default role manager may not necessarily have to receive a leadership assignment request to determine that a leader assignment decision is to be made with respect to a given service node. Instead, for example, the default role manager may keep track of the health status of various service nodes (including the particular node which was most recently made the leader), and determine that a leadership assignment decision (such as the selection of a new leader node, or a renewal of the leadership status of a given service node) based on collected node health information and/or timeouts set at the default role manager.

If the default role manager determines that the policy allows the assignment of leadership to the requesting service node (i.e., there is no other node which can be considered a valid leader) (as also detected in element 816), a new leadership RIV may be selected from Subset-A (the collection of RIVs assignable by the default role manager) (element 819). The new leadership RIV may be selected in an order defined in the policy, e.g., so as to override any leadership selections that may have been made previously. For example, if the highest RIV among currently-assigned RIVs indicates leadership, and the previous highest assigned RIV known to the default role manager is 355, the next higher RIV 357 may be selected as the leadership RIV. The leadership RIV may be transmitted, together with associated lease information in some embodiments, to the requesting service node (element 822). A record of the RIV selected may be retained in a repository such as a logical registry maintained by the default role manager in the depicted embodiment. Other service nodes may be notified regarding the leadership assignment (e.g., via notification messages, or via the repository to which the service nodes may have read access). After the processing of the leadership assignment request is complete, the default role manager may wait until the next request is received, and repeat the operations corresponding to elements 813 onwards for the next request.

Figure 9:
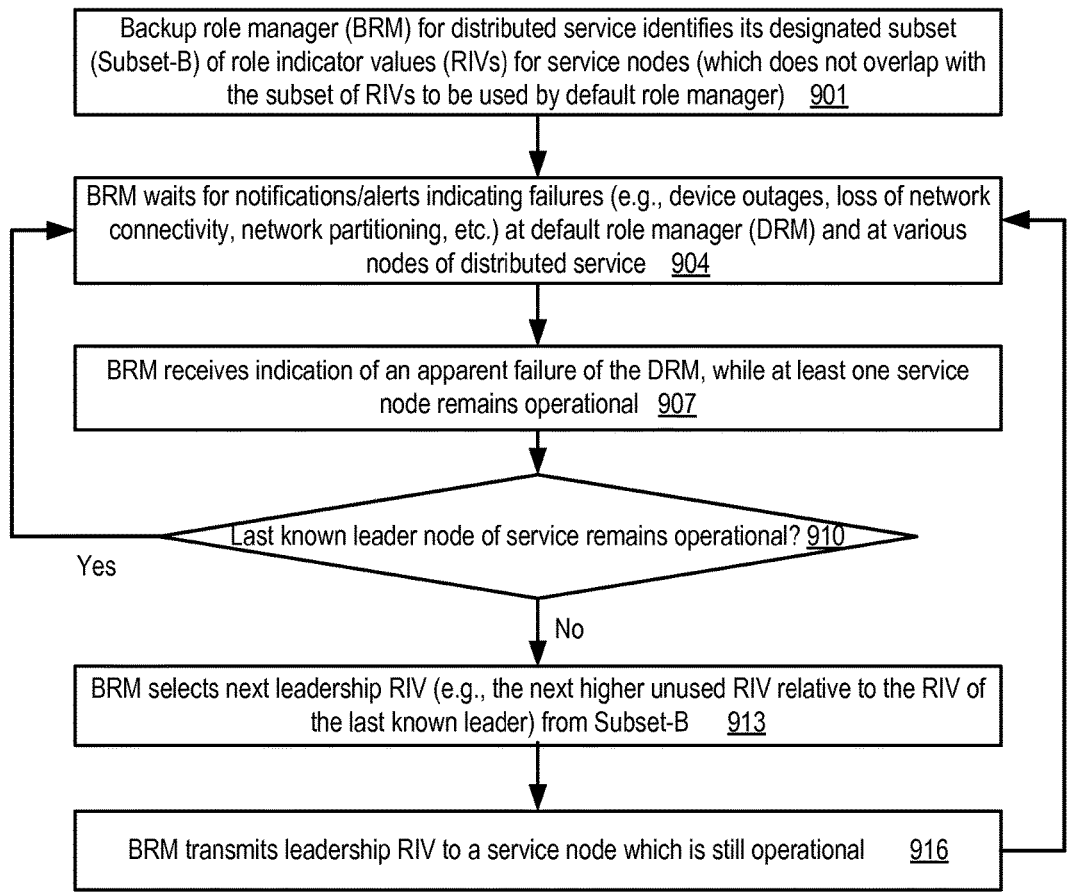
FIG. 9 is a flow diagram illustrating aspects of operations that may be performed by a backup role manager of a distributed service, according to at least some embodiments.

FIG. 9 is a flow diagram illustrating aspects of operations that may be performed by a backup role manager of a distributed service, according to at least some embodiments. As shown in element 901, the backup role manager (BRM), which may be implemented at one or more computing devices, may identify the subset of role indicator values (Subset-B in the terminology used earlier) which are assignable by the BRM and not by the default role manager (DRM). The BRM may subscribe to or participate in various types of failure notification mechanisms and/or health reporting mechanisms, and may also have read access to logs generated by health monitors of the distributed service nodes and the DRM in the depicted embodiment. During normal operating conditions, the BRM may wait for notifications/alerts indicating failures (element 904) at the DRM and at the distributed service.

In response to receiving an indication that the DRM has failed, and at least one node of the distributed service remains operational and reachable (element 907), the BRM may check whether the last-known leader node of the distributed service has also failed. As mentioned earlier, the BRM may either keep track of the leadership state changes as they occur (e.g., by receiving notifications from the DRM), or may identify the last-known leader based at least in part on information received from one of the operational nodes of the distributed service. If the last-known leader remains operational (as detected in element 910), the BRM may not select a new leader in the depicted embodiment; instead, for example, the BRM may simply resume waiting for additional failure notifications (element 904). If neither the last-known leader nor the DRM is operational, the BRM may select a next leadership RIV from Subset-B to be used to designate a new leader of the distributed service (element 913). For example, if the leader role corresponds to the highest RIV among the assigned RIVs, and the RIV of the last-know RIV was RIV-j (e.g., 567 if integer RIVs are used), the new RIV selected (e.g., 568) may be higher than RIV-j so that the previous leadership decision can be overridden by the BRM. The selected RIV may be transmitted to one of the operational or surviving nodes of the distributed service (element 916), and the BRM may resume waiting for additional failure notifications (element 904). Any of a number of criteria may be used by the BRM to select the new leader—e.g., one of the operational nodes may be selected at random, or performance/workload metrics may be used to select a lightly-loaded service node as the new leader. In some embodiments, if and when the operational nodes of the distributed service determine that the DRM has failed and that the last-known leader has failed, they may transmit leadership assignment requests to the BRM. In at least one embodiment, the BRM may implement a lease mechanism similar to that indicated in FIG. 7, and information about the lease may be transmitted along with the new leader RIV to the service node selected as the new leader by the BRM.

Figure 10:
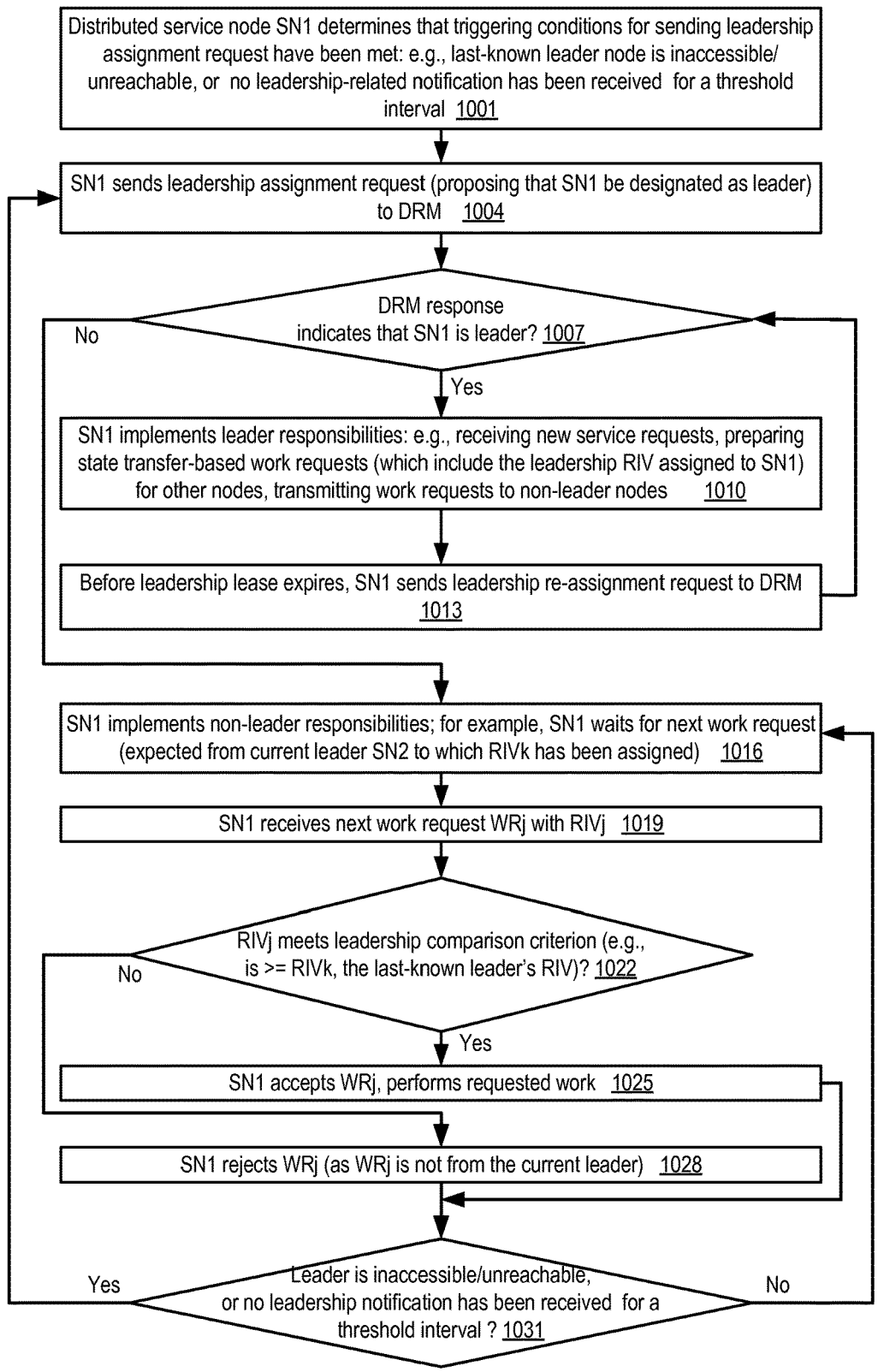
FIG. 10 is a flow diagram illustrating aspects of operations that may be performed by a node of a distributed service for which leader selection decisions are made at a role manager, according to at least some embodiments.

FIG. 10 is a flow diagram illustrating aspects of operations that may be performed by a node of a distributed service for which leader selection decisions are made at a role manager, according to at least some embodiments. As shown in element 1001, a service node SN1 may determine that the triggering condition(s) for transmitting a leadership assignment request have been met. For example, such a triggering condition may include detecting that the last-known leader node is unreachable, or that leadership-related notifications (such as new leader selection notifications, or leader re-assignment notifications) have not been received for some threshold time period. A request to designate SN1 as the leader may be transmitted to the DRM (element 1004).

If SN1 receives a message from the DRM indicating that SN1 has been designated as the leader (element 1007), SN1 may start (or resume, if it was previously the leader), executing the responsibilities of the leader role (element 1010). The message may contain, for example, a leader role indicating value (RIV) selected from the DRM's subset of RIVs, and/or an indication of a lease which has been granted to SN1 on the leader role. The leader responsibilities may include fulfilling at least one category of service requirements, e.g., by receiving client requests and distributing corresponding state-transfer based work requests to the non-leader nodes of the service. The work requests may include an RIV provided by the DRM in response to the leadership assignment request, which may be used by the non-leader nodes as evidence indicating that the work requests are from the current leader as described below. In embodiments in which the DRM implements a lease mechanism associated with the leader role, SN1 may transmit a leadership re-assignment or lease renewal request to the DRM before the lease expires (element 1013). In response to the re-assignment request, the DRM may once again send a response indicating that SN1 remains the leader (and, if necessary, that the leadership lease has been renewed). As long as such messages confirming SN1's leadership status continue to be received, operations corresponding to elements 1010 and 1013 may be performed iteratively.

It may be the case, however, that a negative response to a leadership assignment or re-assignment request from SN1 is received from the DRM. If the response indicates that SN1 is not designated as the leader (as also detected in element 1007), SN1 may execute the responsibilities of a non-leader role (element 1016). Such responsibilities may include, for example, waiting for and responding to work requests sent by the leader node. In at least one embodiment, the identity and/or the RIV (RIVk) assigned to the leader may have been provided to or determined by SN1 (e.g., in a leadership assignment rejection message from the DRM).

SN1 may receive the next work request WRj in its non-leader role (element 1019). The work request may include the RIV (RIVj) of the sender or source of the work request. SN1 may check whether RIVj meets the criterion associated with the leader role according to the service's role assignment policy—e.g., in a scenario in which the highest assigned RIV corresponds to leadership, whether RIVj is higher than or equal to the highest RIV (RIVk) of which SN1 is aware. If RIVj meets the leadership-determining criterion (as detected in operations corresponding to element 1022), SN1 may accept the work request WRj and perform the requested work (element 1025). Otherwise, WRj may be rejected, e.g., on the grounds that it does not appear to have been sent by the leader node (element 1028). As long as SN1 continues to receive leadership-related notifications (e.g., indicating assignment or re-assignment of the leader role to some other node) within threshold time intervals (e.g., once every N seconds), and does not become aware of a failure of the leader node, SN1 may continue performing its non-leader duties. If these conditions met (as detected in element 1031), the operations corresponding to elements 1016-1028 may be repeated for various work requests by SN1. If, however, SN1 determines that the leader node has failed, or does not receive leadership notifications within an expected time window (as also detected in element 1031), this may trigger the transmission of a leadership assignment request from SN1 (element 1004).

It is noted that in various embodiments, some of the operations shown in the flow diagrams of FIG. 8, FIG. 9 and FIG. 10 may be implemented in a different order than that shown in the figure, or may be performed in parallel rather than sequentially. For example, in some embodiments the operations performed at the service nodes to check whether the criteria for sending a new leadership assignment (or re-assignment) request have been met may be made in parallel with (and/or asynchronously with respect to) the operations to fulfill service requests. Additionally, some of the operations shown in one or more of the flow diagrams may not be required in one or more implementations.

Use Cases

The techniques and algorithms described above, of separating the collection of role indicator values which can be assigned by a default role manager of a distributed service from the collection of role indicator values which can be assigned by an alternate or backup role manager, may be useful in a variety of environments. Although large-scale failure scenarios, in which for example both the default role manager and some or all the service nodes appear to be unavailable more or less concurrently are typically rare in modern provider network environments, the negative consequences of such large-scale failure events (e.g., lost business opportunities, reputational damage, etc.) may be severe. Ensuring that the default and alternate role managers cannot inadvertently select the same leadership-indicating value for different service nodes (which could cause problems even after the failure event has ended) may help minimize the chances of ambiguous leadership scenarios and associated service interruptions for mission-critical distributed services.

Illustrative Computer System

Figure 11:
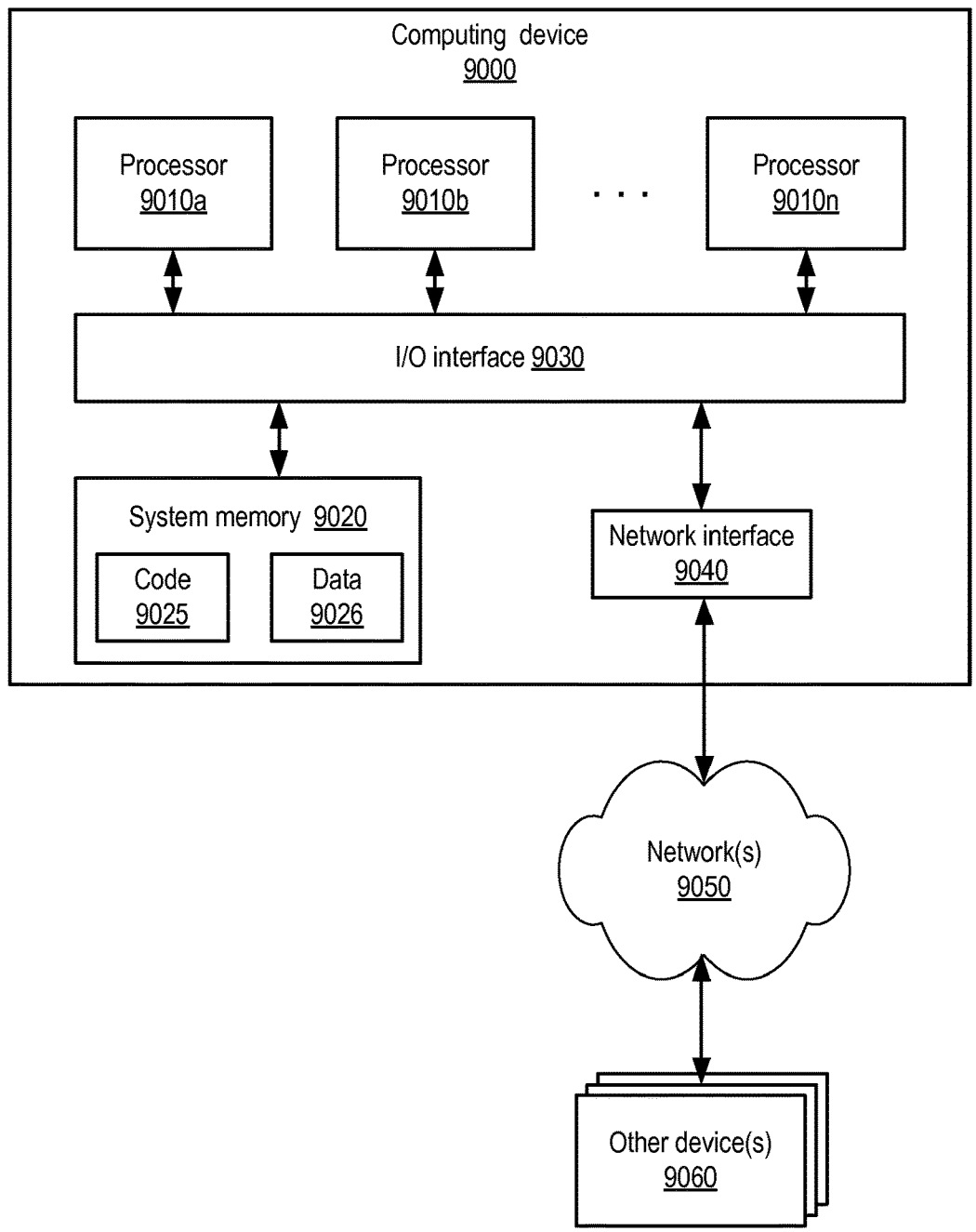
FIG. 11 is a block diagram illustrating an example computing device that may be used in at least some embodiments.

In at least some embodiments, a server that implements one or more of the techniques described above for leadership-related decisions of a distributed service, including for example a distributed or non-distributed default role manager, a backup role manager and/or the distributed service nodes, may include a general-purpose computer system that includes or is configured to access one or more computer-accessible media. FIG. 11 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferro-electric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a Low Pin Count (LPC) bus, a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG.

1 through FIG. 10, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 10 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 11 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
   a plurality of nodes of a distributed service, wherein individual ones of the plurality of nodes are implemented at respective computing devices; and
   a distributed role manager implemented at a plurality of computing devices;
   wherein the distributed role manager is configured to:
      receive a leadership assignment request from a particular node of the plurality of nodes;
      determine that designation of the particular node as a leader node of the distributed service is permitted by a role assignment policy of the distributed service, wherein the leader node is responsible for fulfilling a first category of service requirements of the distributed service;
      select, from a first subset of a first set of dynamically-assignable role indicator values, in accordance with a role indicator value selection order of the role assignment policy, a particular role indicator value to be assigned to the particular node, wherein the distributed role manager is not authorized to assign role indicator values in a second subset of the first set, wherein the role indicator values in the second subset are different than the role indicator values in the first subset, and wherein a backup role manager of the distributed service is authorized to assign a second role indicator value from the second subset to a node of the distributed service in the event of a failure; and
      transmit the particular role indicator value to the particular node; and
   wherein the particular node of the distributed service is configured to:
      after receiving the particular role indicator value from the distributed state manager, perform an operation to fulfill a service requirement of the first category.

2. The system as recited in claim 1, wherein the first set of dynamically-assignable role indicator values comprises integers within a range, and wherein the second subset comprises those integers of the range which are not part of the first subset.

3. The system as recited in claim 1, wherein, in accordance with the role indicator value selection order, the particular role indicator value selected for the particular node is higher than the highest role indicator value which was previously assigned by the default role manager.

4. The system as recited in claim 1, wherein said operation to fulfill the requirement of the first category comprises:
   preparing a first work request, wherein the first work request includes (a) an indication of a first task to be performed and (b) an indication that the particular node has been assigned the particular role indicator value;
   transmitting the work request for implementation to a different node of the plurality of nodes.

5. The system as recited in claim 4, wherein the different node is configured to:
   prior to an initiation of the first task, verify, based at least in part on the particular role indicator value, that the different node has not received an indication that a node other than the particular node has been designated as the leader node.

6. A method, comprising:
  receiving, at a default role manager implemented at one or more computing devices associated with a distributed service, a leadership assignment request from a particular node of a plurality of nodes of the distributed service, wherein a leader node of the plurality of nodes is responsible for fulfilling a first category of service requirements of the distributed service;
  selecting, by the default role manager from a first subset of a first set of dynamically-assignable role indicator values, in accordance with a role indicator value selection order of a role assignment policy of the distributed service, a particular role indicator value to be assigned to the particular node, wherein the default role manager is not authorized to assign role indicator values in a second subset of the first set, wherein the role indicator values in the second subset are different than the role indicator values in the first subset, and wherein another role manager implemented at one or more computing devices associated with the distributed service is authorized to assign a second role indicator value from the second subset to a node of the distributed service; and
  transmitting, by the default role manager, the particular role indicator value to the particular node; and
  after receiving the particular role indicator value from the distributed state manager, performing, by the particular node, an operation to fulfill a service requirement of the first category.

7. The method as recited in claim 6 wherein the other role manager is a backup role manager, and further comprising:
  determining, by the backup role manager, that (a) a failure associated with the default role manager has occurred, and (b) a node to which leadership was assigned by the default role manager is unable to fulfill at least one service requirement of the first category;
  selecting, by the backup role manager, the second role indicator value from the second subset as a leadership indicator value; and
  transmitting the new role indicator value to a second node of the plurality of nodes.

8. The method as recited in claim 6, wherein a size of the first subset differs from a size of the second subset.

9. The method as recited in claim 6, wherein, in accordance with the role indicator value selection order, the particular value is higher than the highest role indicator value which was previously assigned by the default role manager.

10. The method as recited in claim 6, wherein according to a leadership determination criterion of the role assignment policy, the node assigned the highest role indicator value among role indicator values of the plurality of nodes is the leader node.

11. The method as recited in claim 6, further comprising, performing by the default role manager after assigning the particular role indicator value to the particular node:
  initiating a notification to a different node of the plurality of nodes, indicating that the particular node has been designated as the leader node.

12. The method as recited in claim 6, wherein said operation to fulfill the requirement of the first category comprises:
  preparing a first work request, wherein the first work request includes (a) an indication of a first task to be performed and (b) an indication that the particular node has been assigned the particular role indicator value;
  transmitting the work request for implementation to a different node of the plurality of nodes.

13. The method as recited in claim 12, further comprising:
  receiving, by the different node, a second work request from a second node, wherein the second work request includes (a) an indication of a second task and (b) an indication of a second role indicator value assigned to the second node;
  determining, by the different node, not to fulfill the second work request based at least in part on comparing the second role indicator value and the particular role indicator value.

14. The method as recited in claim 6, wherein the default role manager comprises a plurality of voting subcomponents, further comprising:
  implementing, by the plurality of voting subcomponents, a quorum-based protocol to determine that the particular node is to be assigned the particular role indicator value.

15. The method as recited in claim 6, further comprising:
  determining, by the particular node, to transmit the leadership assignment request to the default role manager, based at least in part on a time interval which has elapsed since the leader role was previously assigned by the default role manager.

16. The method as recited in claim 6, further comprising:
  in response to determining that the time elapsed since the particular role indicator value was received at the particular node meets a threshold criterion, transmitting, by the particular node, a leadership re-assignment request to the default role manager;
  selecting, by the default role manager in response to the leadership re-assignment request, a new role indicator value from the first subset; and
  transmitting, by the default role manager to the particular node, the new role indicator value.

17. A non-transitory computer-accessible storage medium storing program instructions that when executed on one or more processors implement a first role manager of a distributed service, wherein the first role manager is configured to:
  determine that a leadership assignment decision is required with respect to a particular node of a plurality of nodes of the distributed service, wherein a leader node of the plurality of nodes is responsible for fulfilling a first category of service requirements of the distributed service;
  identify, from a first subset of a first set of dynamically-assignable role indicator values, in accordance with a role indicator value selection order of a role assignment policy, a particular role indicator value to be assigned to the particular node, wherein the first role manager is not authorized to assign role indicator values in a second subset of the first set, wherein the role indicator values in the second subset are different than the role indicator values in the first subset, and wherein another role manager of the distributed service is authorized to assign a second role indicator value from the second subset to a node of the distributed service; and
  transmit the particular role indicator value to the particular node.

18. The non-transitory computer-accessible storage medium as recited in claim 17, wherein the first set of dynamically-assignable role indicator values comprises at least one non-numeric value.

19. The non-transitory computer-accessible storage medium as recited in claim 17, wherein according to the role assignment policy, the node with the lowest role indicator value among the role indicator values of the plurality of nodes is designated as the leader node.

20. The non-transitory computer-accessible storage medium as recited in claim 17, wherein, after assigning the leadership indicator value to the particular node, the first role manager is configured to:
- initiate a notification to a different node of the plurality of nodes, indicating that the particular node has been designated as the leader node.

\* \* \* \* \*